(12) United States Patent
Fees et al.

(10) Patent No.: US 11,158,899 B2
(45) Date of Patent: Oct. 26, 2021

(54) BATTERY MODULE WITH CELL FIXATION BRACKETS

(71) Applicant: Tiveni MergeCo Inc., San Mateo, CA (US)

(72) Inventors: Heiner Fees, Bietigheim-Bissingen (DE); Andreas Track, Sachsenheim (DE); Ralf Maisch, Abstatt (DE); Alexander Eichhorn, Eppingen (DE); Jörg Damaske, Freiberg (DE); Valentin Brokop, Walheim (DE); Hans-Joachim Pflüger, Wüstenrot (DE); Claus Gerald Pflüger, Markgröningen (DE)

(73) Assignee: TIVENI MERGECO, INC., Redwood City, CA (US)

( * ) Notice: Subject to any disclaimer, the term of this patent is extended or adjusted under 35 U.S.C. 154(b) by 126 days.

(21) Appl. No.: 16/536,137

(22) Filed: Aug. 8, 2019

(65) Prior Publication Data

US 2020/0052258 A1 Feb. 13, 2020

Related U.S. Application Data

(60) Provisional application No. 62/716,667, filed on Aug. 9, 2018.

(51) Int. Cl.
| | | |
|---|---|---|
| *H01M 2/02* | (2006.01) | |
| *H01M 2/10* | (2006.01) | |
| *H01M 2/20* | (2006.01) | |
| *H01M 2/22* | (2006.01) | |
| *B60K 1/04* | (2019.01) | |
| *B60L 50/64* | (2019.01) | |
| *H01M 50/20* | (2021.01) | |
| *H01M 50/10* | (2021.01) | |
| *H01M 50/107* | (2021.01) | |
| *H01M 50/502* | (2021.01) | |
| *H01M 50/528* | (2021.01) | |

(52) U.S. Cl.
CPC ............... *H01M 50/20* (2021.01); *B60K 1/04* (2013.01); *B60L 50/64* (2019.02); *H01M 50/10* (2021.01); *H01M 50/107* (2021.01); *H01M 50/502* (2021.01); *H01M 50/528* (2021.01); *B60K 2001/0405* (2013.01); *H01M 2220/20* (2013.01)

(58) Field of Classification Search
CPC .... H01M 50/20; H01M 50/10; H01M 50/107; H01M 50/502; H01M 50/528; H01M 2220/20; B60K 1/04; B60K 2001/0405; B60L 50/64; Y02E 60/10; Y02T 10/70; B29C 45/00; B29K 2995/0041
See application file for complete search history.

(56) References Cited

U.S. PATENT DOCUMENTS

| | | | |
|---|---|---|---|
| 2012/0121949 A1 | 5/2012 | Eberhard et al. | |
| 2013/0230760 A1* | 9/2013 | Pan | H01M 50/20 429/120 |
| 2016/0149180 A1* | 5/2016 | Tokoo | H01M 50/40 429/120 |
| 2018/0108886 A1 | 4/2018 | Fees et al. | |
| 2018/0123192 A1* | 5/2018 | Fees | H01M 10/63 |
| 2019/0312247 A1* | 10/2019 | Hilmann | B60K 1/04 |

FOREIGN PATENT DOCUMENTS

| | | |
|---|---|---|
| CN | 205488277 U | 8/2016 |
| CN | 207303175 U | 5/2018 |
| CN | 207611807 U | 7/2018 |

OTHER PUBLICATIONS

International Search Report dated Dec. 9, 2019 for Application No. PCT/US2019/046056.

* cited by examiner

*Primary Examiner* — Muhammad S Siddiquee

(74) *Attorney, Agent, or Firm* — Muncy, Geissler, Olds & Lowe, P.C.; Daniel Podhajny

(57) ABSTRACT

In an embodiment, a battery module includes a first layer of battery cells, and a first set of brackets that are each configured to fix at least one battery cell of the first layer of battery cells into a defined position.

14 Claims, 32 Drawing Sheets

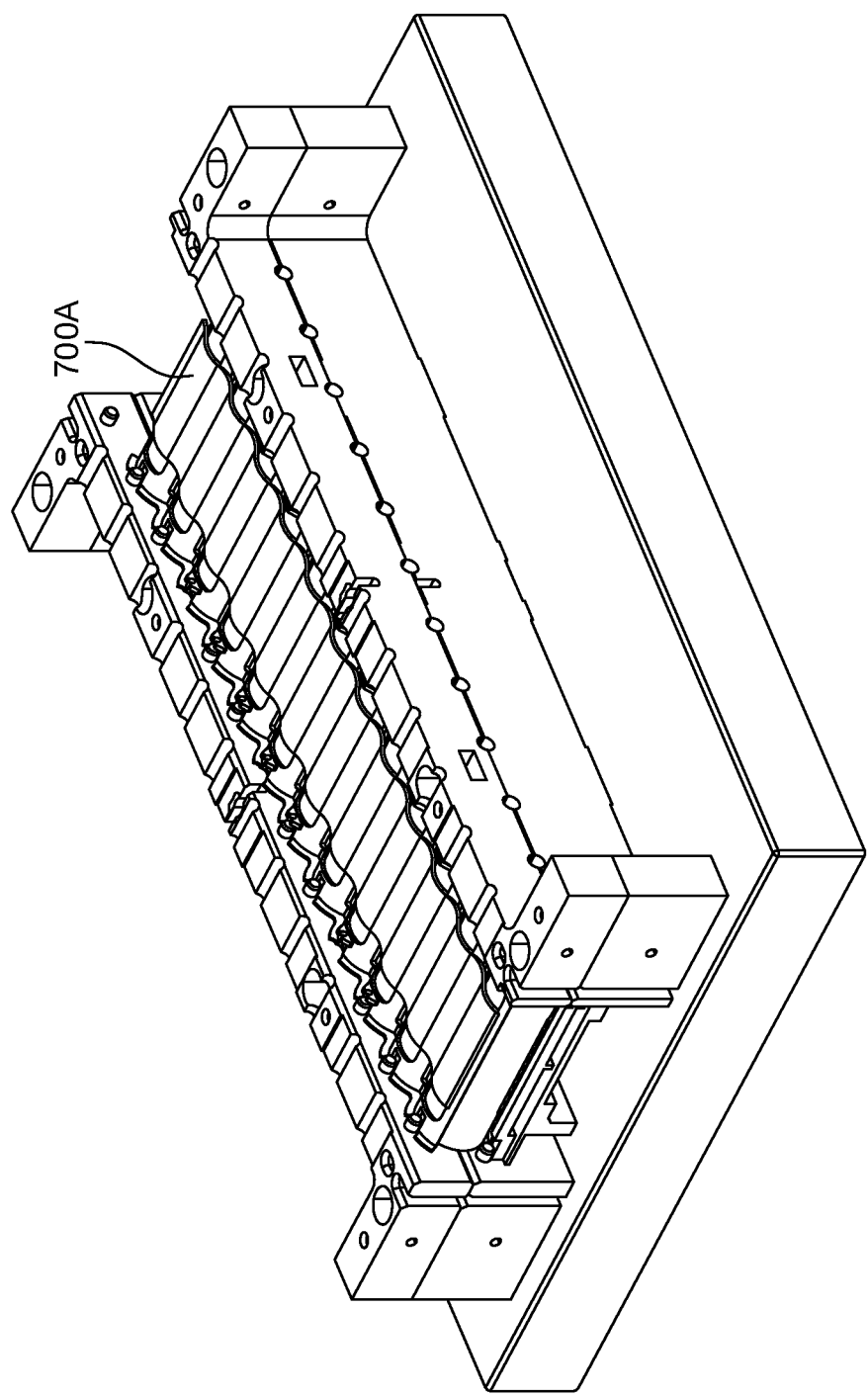

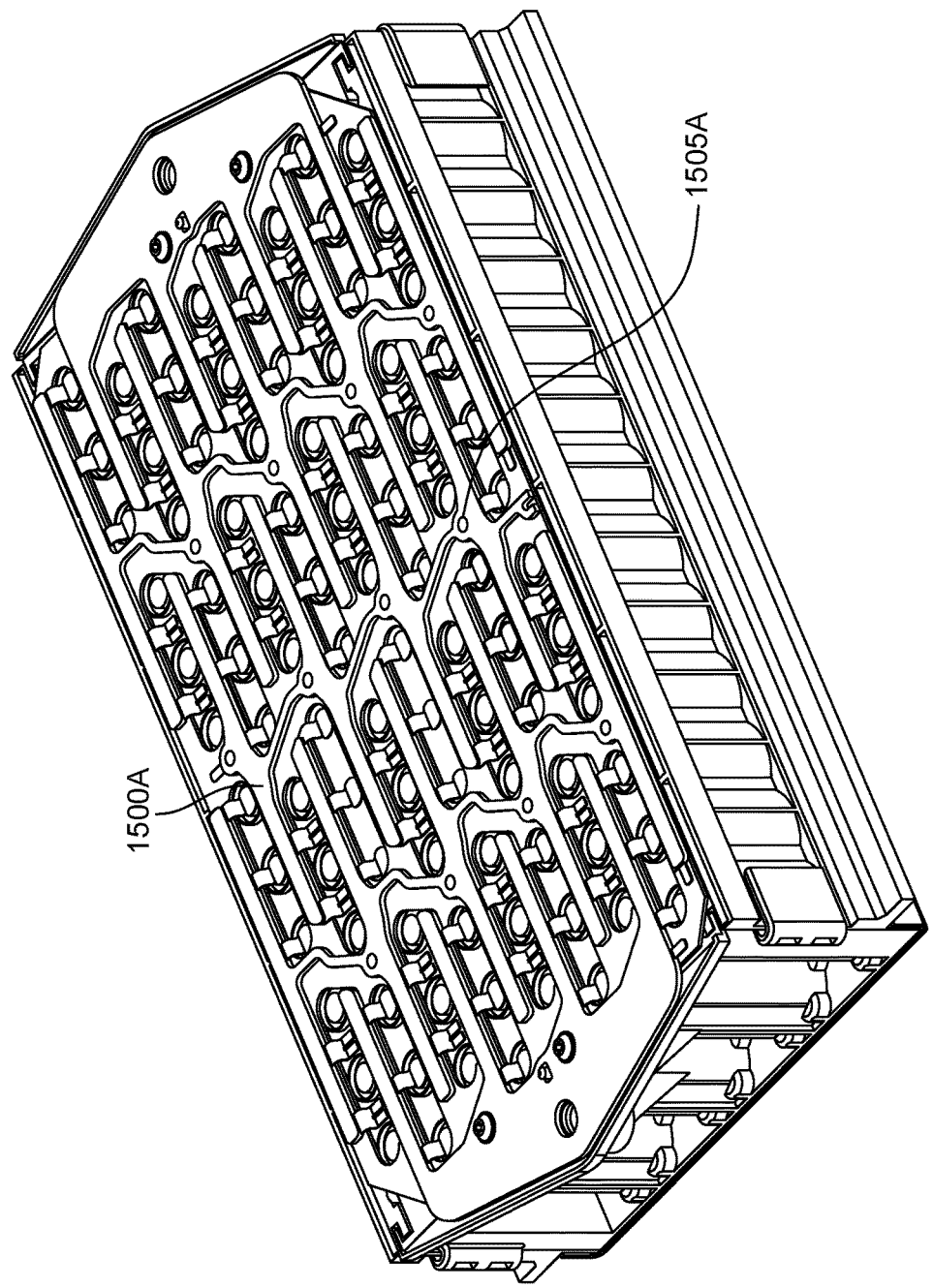

BATTERY MODULE WITH CELL FIXATION BRACKETS

CROSS-REFERENCE TO RELATED APPLICATIONS

The present Application for patent claims the benefit of U.S. Provisional Application No. 62/716,667, entitled "BATTERY MODULE WITH CELL FIXATION BRACKETS AND METHOD OF ASSEMBLY", filed Aug. 9, 2018, which is assigned to the assignee hereof and hereby expressly incorporated by reference herein in its entirety.

BACKGROUND

1. Field of the Disclosure

Embodiments relate to a battery module with cell fixation brackets and method of assembly.

2. Description of the Related Art

Energy storage systems may rely upon batteries for storage of electrical power. For example, in certain conventional electric vehicle (EV) designs (e.g., fully electric vehicles, hybrid electric vehicles, etc.), a battery housing mounted into an electric vehicle houses a plurality of battery cells (e.g., which may be individually mounted into the battery housing, or alternatively may be grouped within respective battery modules that each contain a set of battery cells, with the respective battery modules being mounted into the battery housing). The battery modules in the battery housing are electrically connected (e.g., in series or in parallel) to a battery junction box (BJB) via busbars, which distribute electric power to an electric motor that drives the electric vehicle, as well as various other electrical components of the electric vehicle (e.g., a radio, a control console, a vehicle Heating, Ventilation and Air Conditioning (HVAC) system, internal lights, external lights such as head lights and brake lights, etc.).

SUMMARY

In an embodiment, a battery module includes a first layer of battery cells, and a first set of brackets that are each configured to fix at least one battery cell of the first layer of battery cells into a defined position.

BRIEF DESCRIPTION OF THE DRAWINGS

A more complete appreciation of embodiments of the disclosure will be readily obtained as the same becomes better understood by reference to the following detailed description when considered in connection with the accompanying drawings, which are presented solely for illustration and not limitation of the disclosure, and in which.

DETAILED DESCRIPTION

Embodiments of the disclosure are provided in the following description and related drawings. Alternate embodiments may be devised without departing from the scope of the disclosure. Additionally, well-known elements of the disclosure will not be described in detail or will be omitted so as not to obscure the relevant details of the disclosure.

Energy storage systems may rely upon batteries for storage of electrical power. For example, in certain conventional electric vehicle (EV) designs (e.g., fully electric vehicles, hybrid electric vehicles, etc.), a battery housing mounted into an electric vehicle houses a plurality of battery cells (e.g., which may be individually mounted into the battery housing, or alternatively may be grouped within respective battery modules that each contain a set of battery cells, with the respective battery modules being mounted into the battery housing). The battery modules in the battery housing are electrically connected (e.g., in series or in parallel) to a battery junction box (BJB) via busbars, which distribute electric power to an electric motor that drives the electric vehicle, as well as various other electrical components of the electric vehicle (e.g., a radio, a control console, a vehicle Heating, Ventilation and Air Conditioning (HVAC) system, internal lights, external lights such as head lights and brake lights, etc.).

Figure 1A:
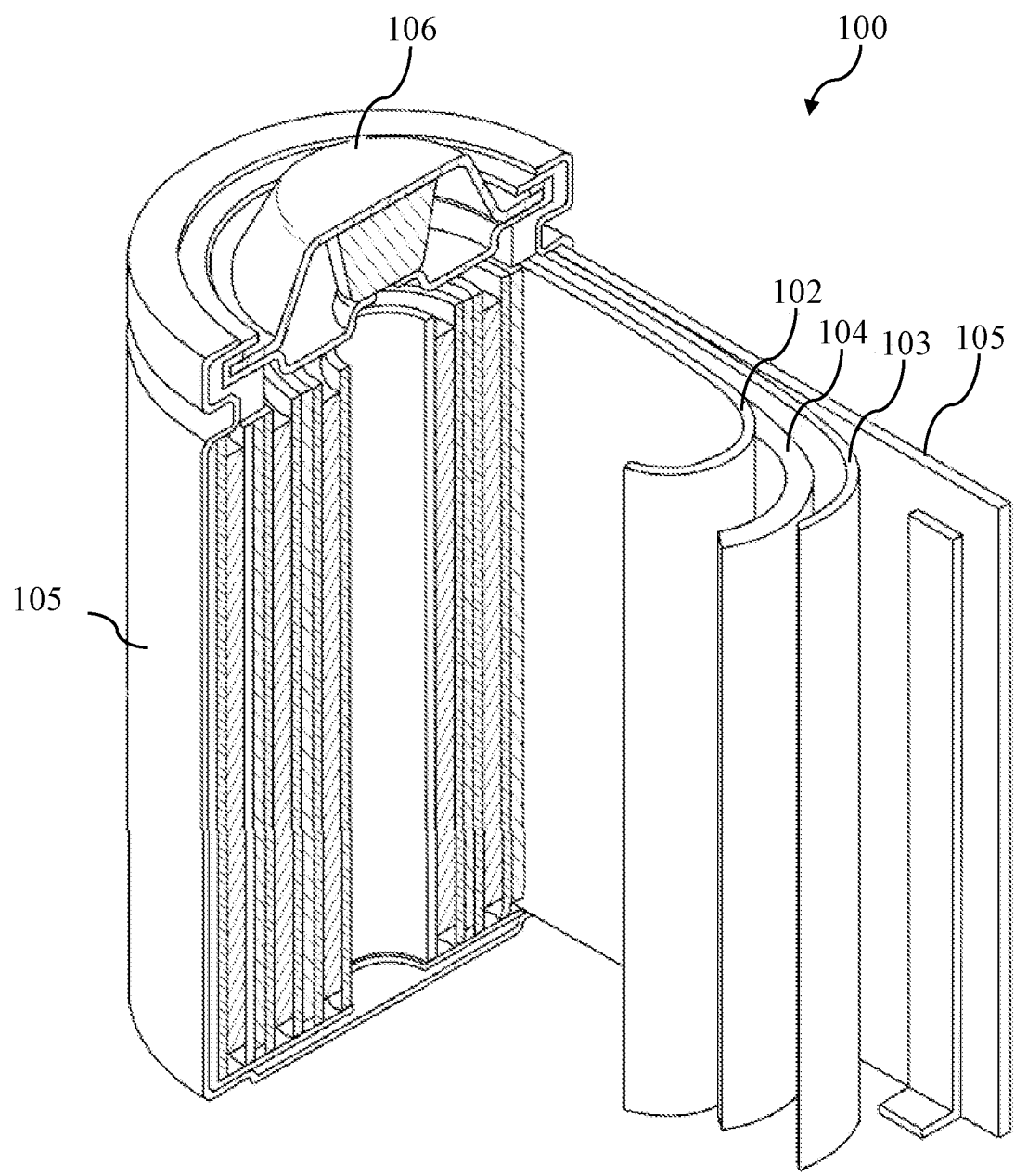
FIG. 1A illustrates an example metal-ion (e.g., Li-ion) battery in which the components, materials, methods, and other techniques described herein, or combinations thereof, may be applied according to various embodiments.

FIG. 1A illustrates an example metal-ion (e.g., Li-ion) battery in which the components, materials, methods, and other techniques described herein, or combinations thereof, may be applied according to various embodiments. A cylindrical battery cell is shown here for illustration purposes, but other types of arrangements, including prismatic or pouch (laminate-type) batteries, may also be used as desired. The example battery 100 includes a negative anode 102, a positive cathode 103, a separator 104 interposed between the anode 102 and the cathode 103, an electrolyte (shown implicitly) impregnating the separator 104, a battery case 105, and a sealing member 106 sealing the battery case 105.

Embodiments of the disclosure relate to various configurations of battery modules that may be deployed as part of an energy storage system. In an example, while not illustrated expressly, multiple battery modules in accordance with any of the embodiments described herein may be deployed with respect to an energy storage system (e.g., chained in series to provide higher voltage to the energy storage system, connected in parallel to provide higher current to the energy storage system, or a combination thereof).

Figure 1B:
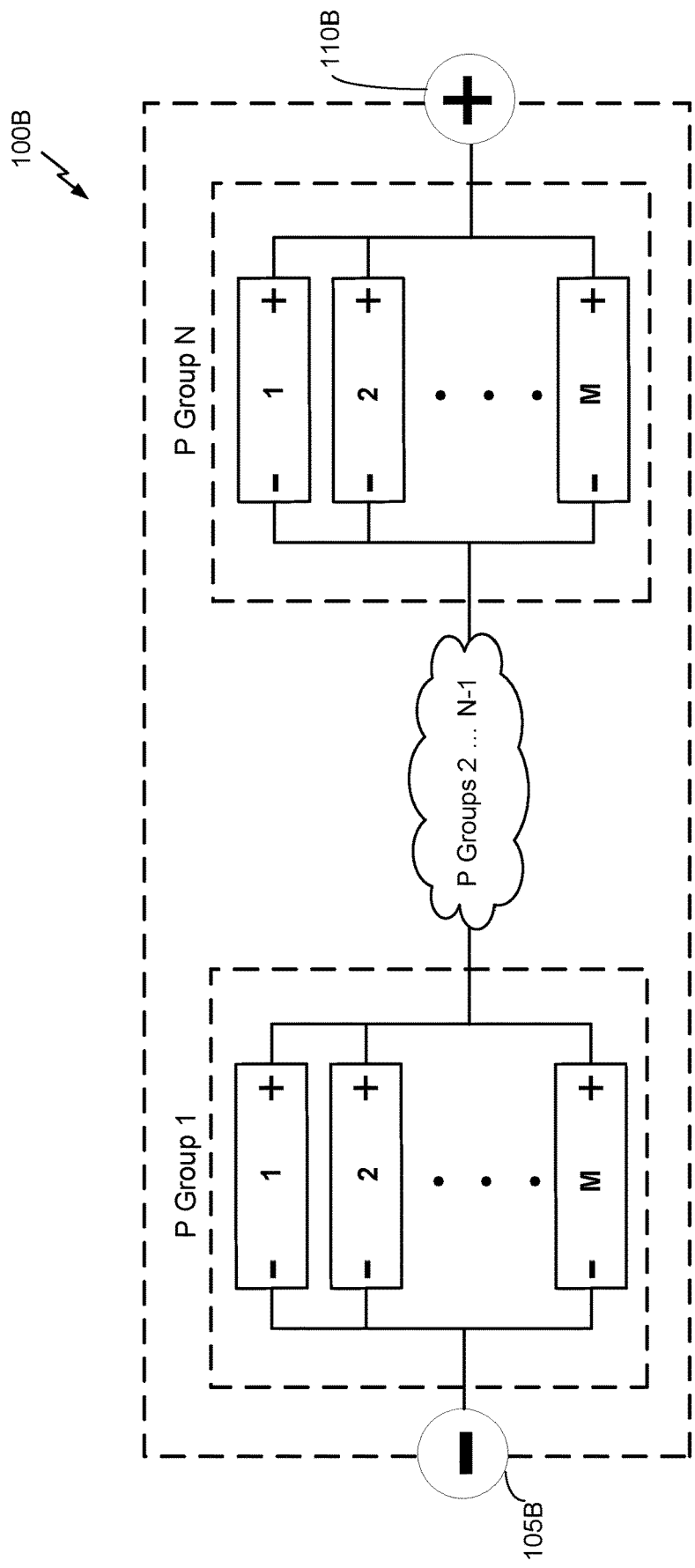
FIG. 1B illustrates a high-level electrical diagram of an exemplary battery module that shows P groups 1 . . . N connected in series in accordance with an embodiment of the disclosure.

FIG. 1B illustrates a high-level electrical diagram of a battery module 100B that shows P groups 1 . . . N connected in series in accordance with an embodiment of the disclosure. In an example, N may be an integer greater than or equal to 2 (e.g., if N=2, then the intervening P groups denoted as P groups 2 . . . N–1 in FIG. 1 may be omitted). Each P group includes battery cells 1 . . . M connected in parallel. The negative terminal of the first series-connected P group (or P group 1) is coupled to a negative terminal 105B of the battery module 100B, while the positive terminal of the last series-connected P group (or P group N) is connected to a positive terminal 110B of the battery module 100B. As used herein, battery modules may be characterized by the number of P groups connected in series included therein. In particular, a battery module with 2 series-connected P groups is referred to as a "2S" system, a battery module with 3 series-connected P groups is referred to as a "3S" system, and so on.

Figure 2:
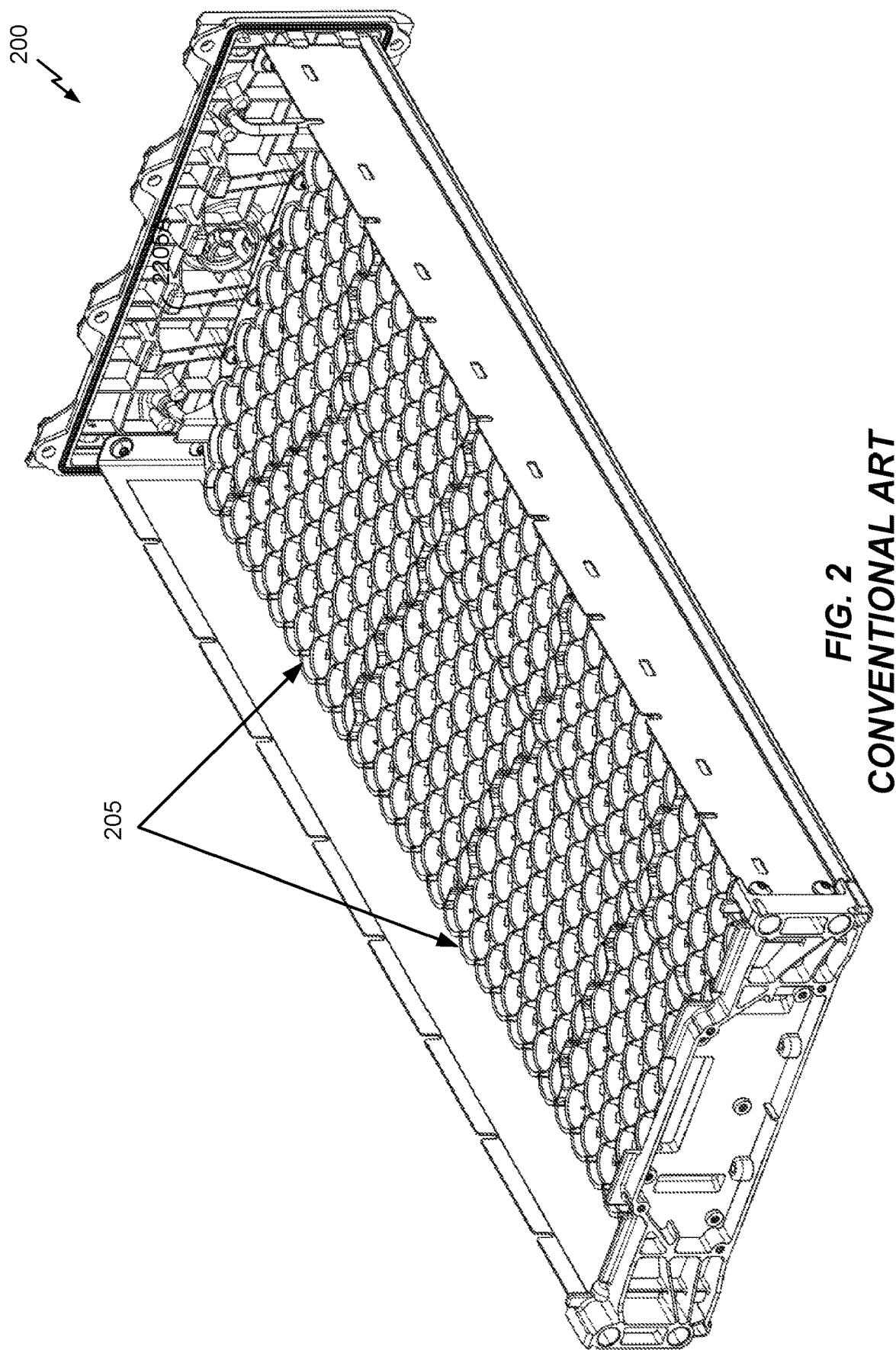
FIG. 2 illustrates a battery module during assembly.

FIG. 2 illustrates a battery module 200 during assembly. In FIG. 2, a bottom cell fixation element 205 containing a plurality of battery cell receptacles for fixing a bottom part of cylindrical battery cells is shown. The bottom cell fixation element 205 may be arranged as a single large piece of plastic (or several joined pieces of plastic) that is inserted and secured (e.g., glued) to a bottom of the battery module 200. The bottom cell fixation element 205 may be arranged such that different contiguous clusters of receptacles correspond to different P Groups.

Figure 3:
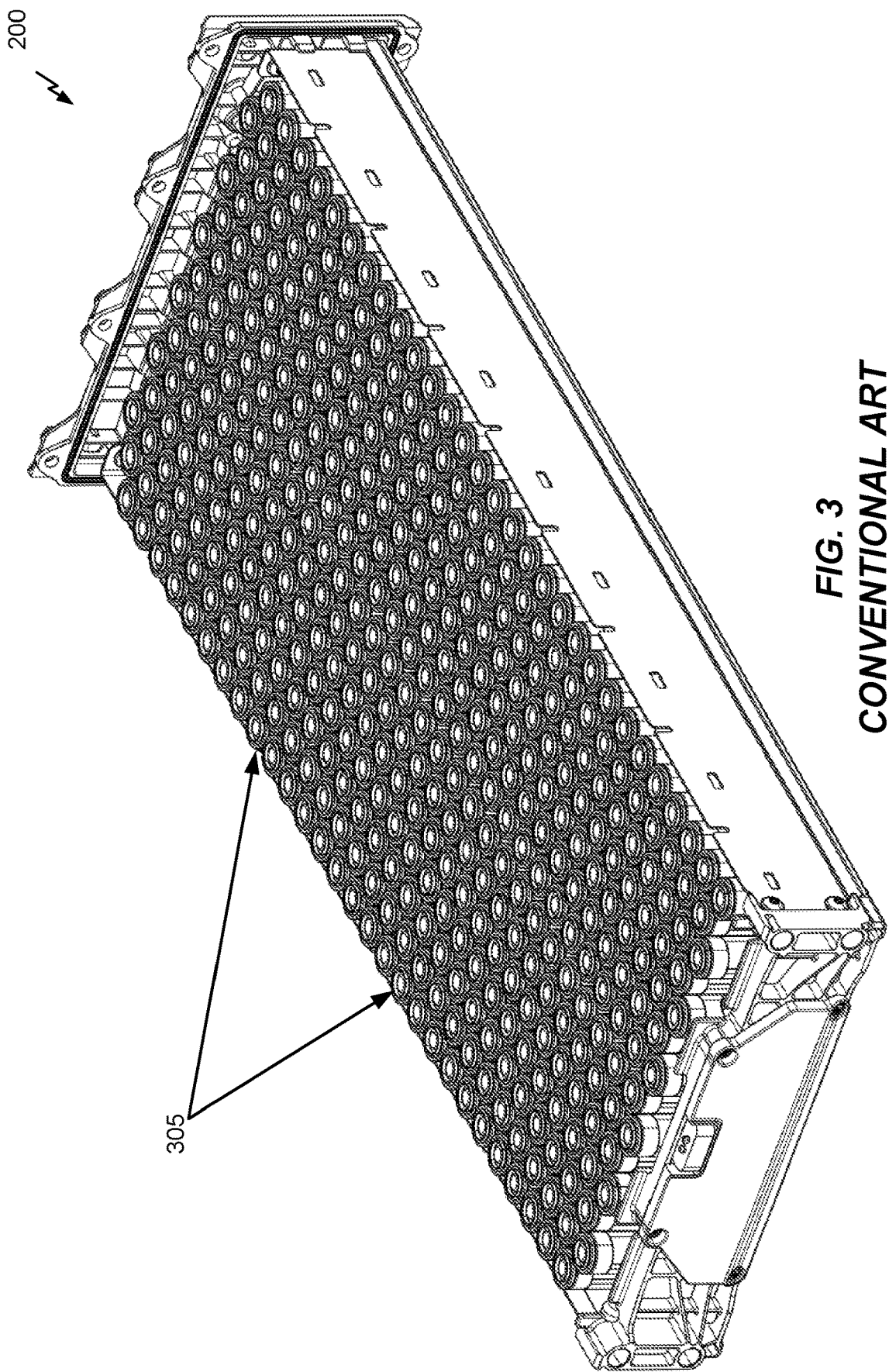
FIG. 3 illustrates the battery module of FIG. 2 during a later point of assembly after battery cells are inserted into respective receptacles of a bottom cell fixation element.

FIG. 3 illustrates the battery module 200 during a later point of assembly after battery cells 305 are inserted into the respective receptacles of the bottom cell fixation element 205. While not shown, a top cell fixation element (not shown) may be arranged over the battery cells 305, such that the battery cells 305 are substantially fixed (or secured) inside the battery module 200 via their attachment to the top cell fixation element 205 (not shown) and the bottom cell fixation element 205.

One drawback to the cell fixation arrangement depicted in FIGS. 2-3 is limited tolerance to crash forces. For example, assume that the battery module 200 is deployed in an electric vehicle that experiences crash forces. The individual battery cells 305 are securely held via the top cell fixation element 205 (not shown) and the bottom cell fixation element 205, which can cause stress and possible rupture to the battery cells 305 depending on the strength of the crash forces.

FIGS. 4-16B illustrate a battery module assembly procedure in accordance with an embodiment of the disclosure.

Figure 4:
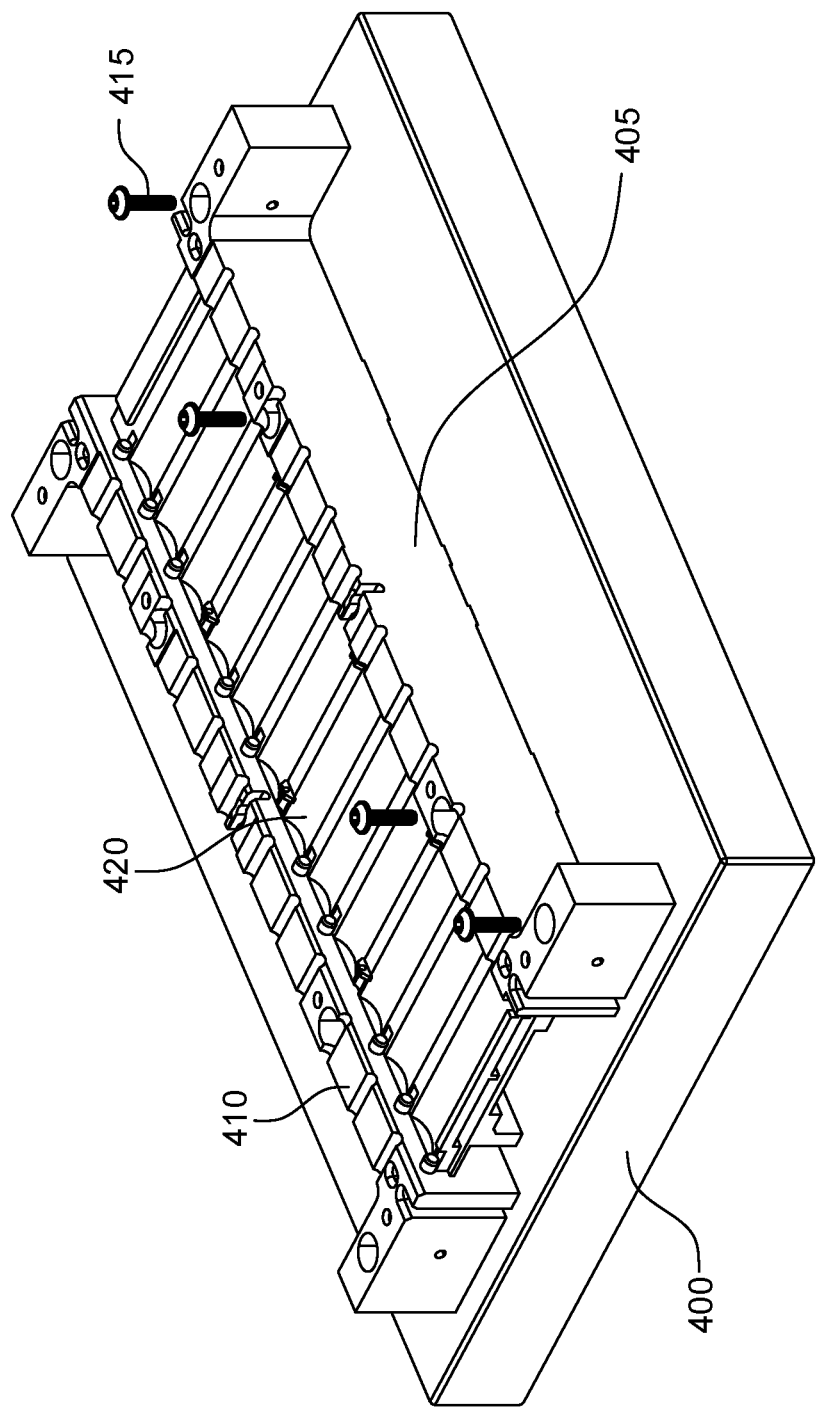
FIGS. 4-16B illustrate a battery module assembly procedure in accordance with an embodiment of the disclosure.

Referring to FIG. 4, the battery module begins construction on a base plate 400 onto which jigs 405-410 (plus side jig 405 and minus side jig 410) are mounted (e.g., via screws 415). The jigs are stackable, as will be discussed below in more detail. An external frame component 420 of the battery module is arranged between the jigs. As used herein, the "minus side" of the battery cell assembly refers to the side of the battery cell that opposes the positive terminal of the battery cell. For certain implementations, battery cells with positive and negative terminals arranged on the same side may be used (e.g., a positive cell head surrounded by a negative cell rim), in which case the "minus side" does not necessarily correspond to the negative terminal of a respective battery cell.

Figure 5:
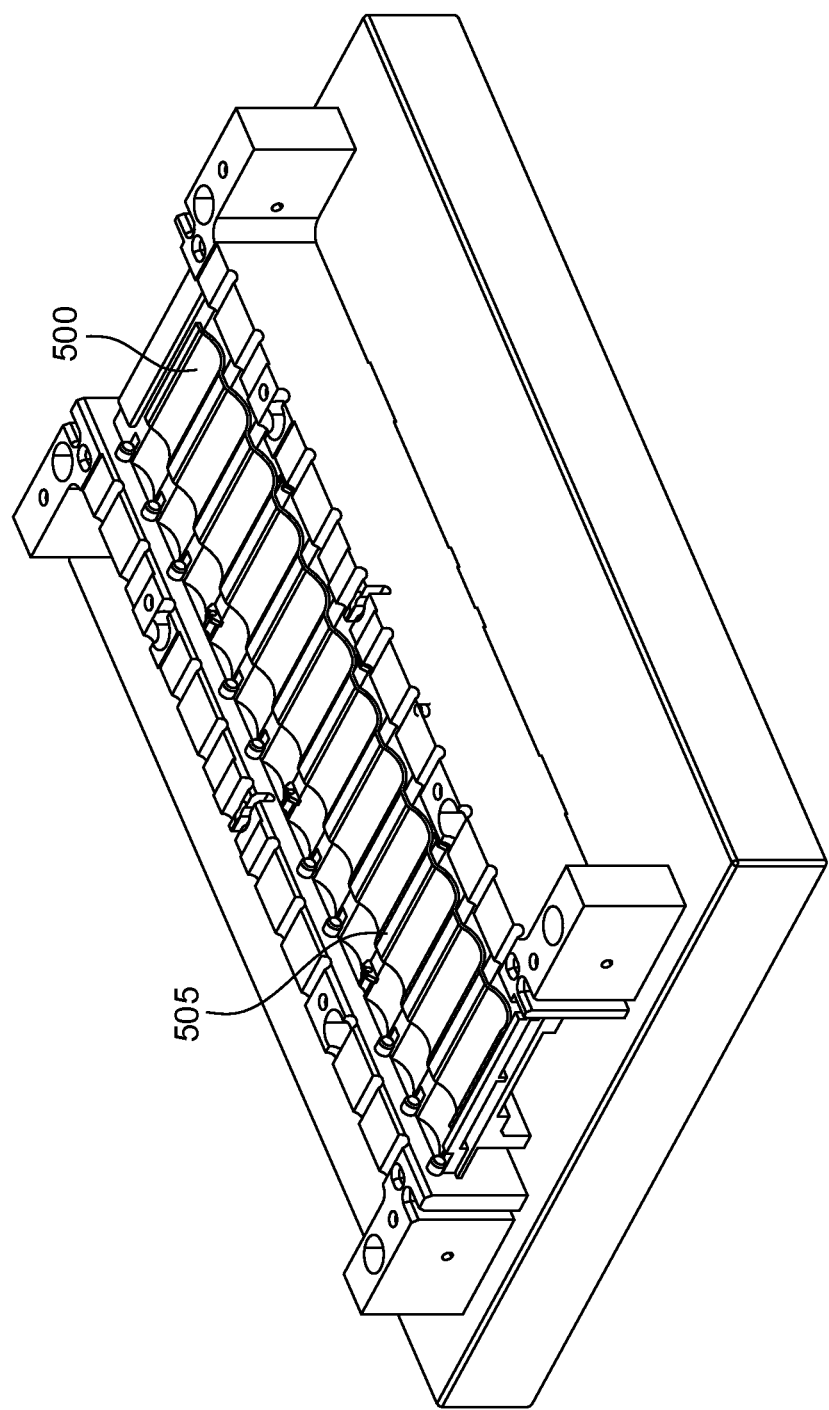

Referring to FIG. 5, an insulative layer 500 is glued onto the external frame component 420 via a dispensing machine 505.

Figure 6A:
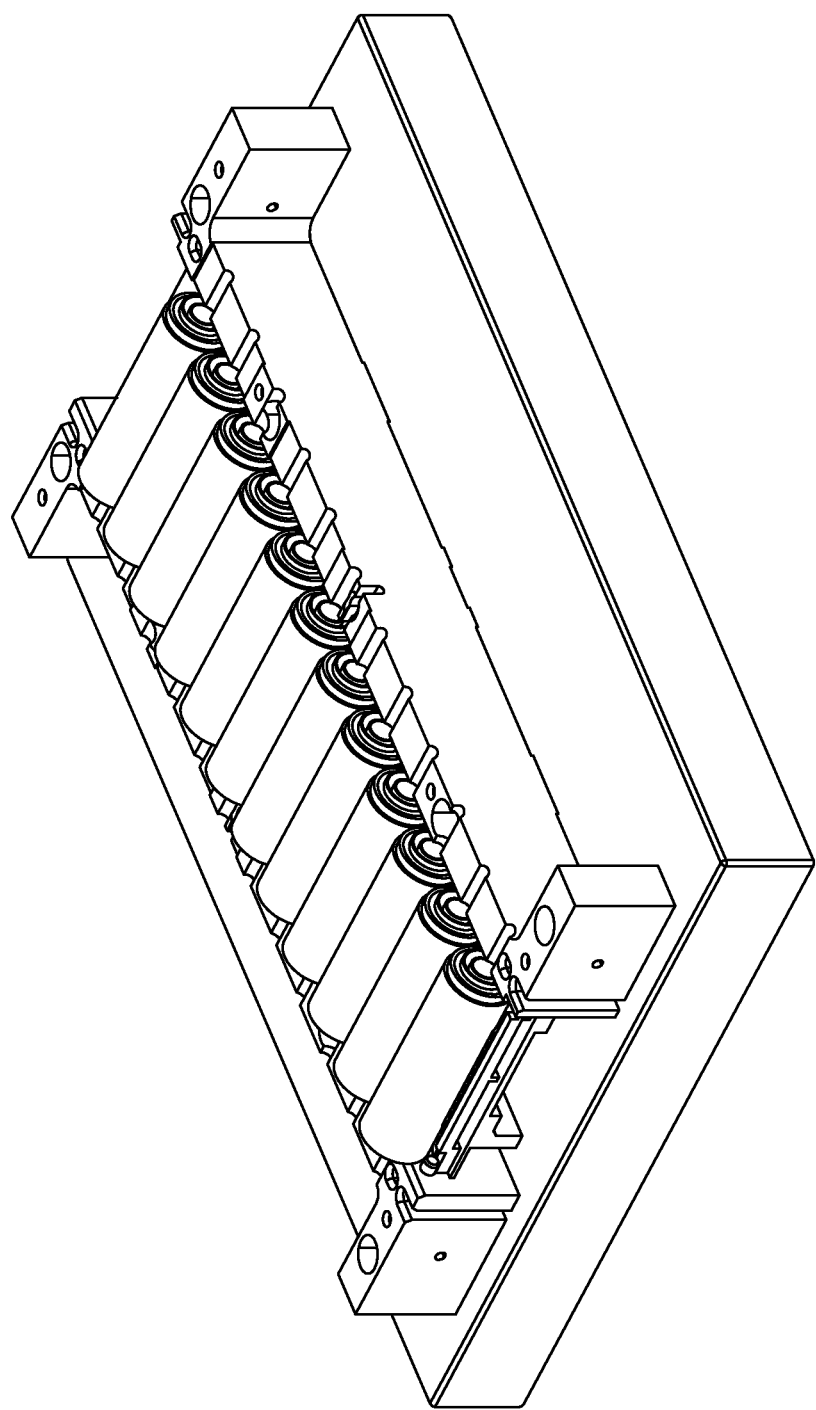
Figure 6B:
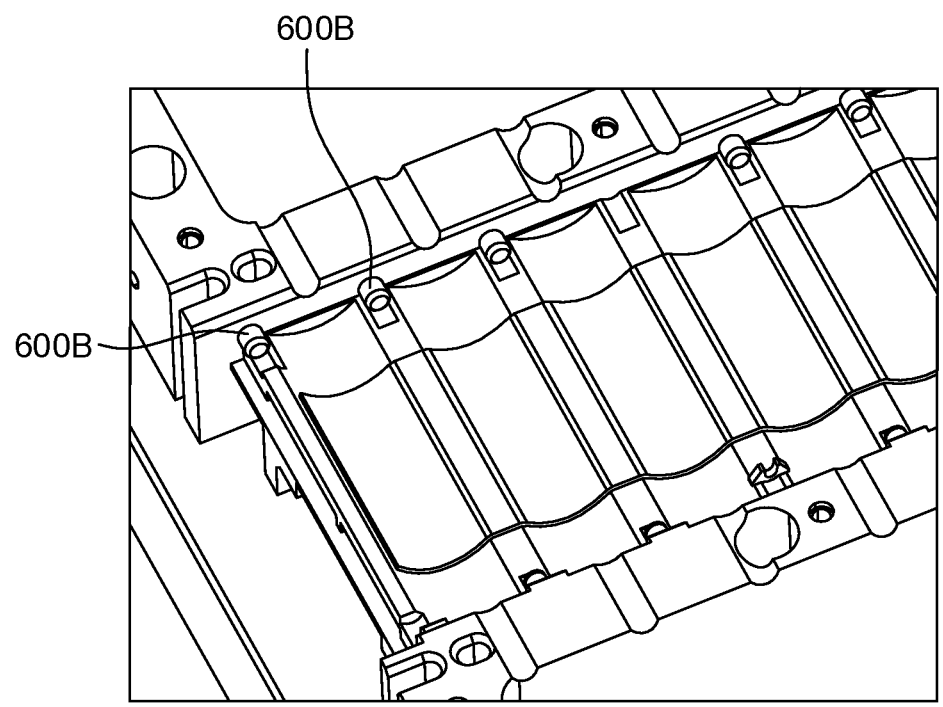
Figure 6C:
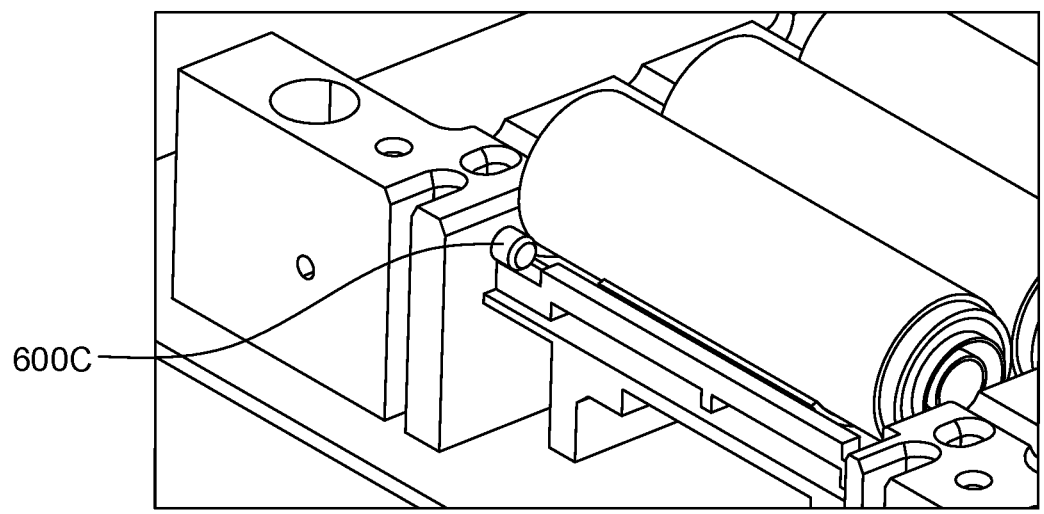

Referring to FIG. 6A, a cell layer 1 is placed onto the insulative layer. In the embodiment of FIG. 6A, the cell layer 1 includes 12 cylindrical battery cells that are each part of the same P Group. FIGS. 6B-6C demonstrate how pins 600B-600C arranged on the respective jigs can be used to fix the position of each cell in the cell layer 1. In an example, magnets may be integrated into each minus side jig to pull the respective cells of each cell layer so that the minus side of each cell layer is flush.

Figure 7A:
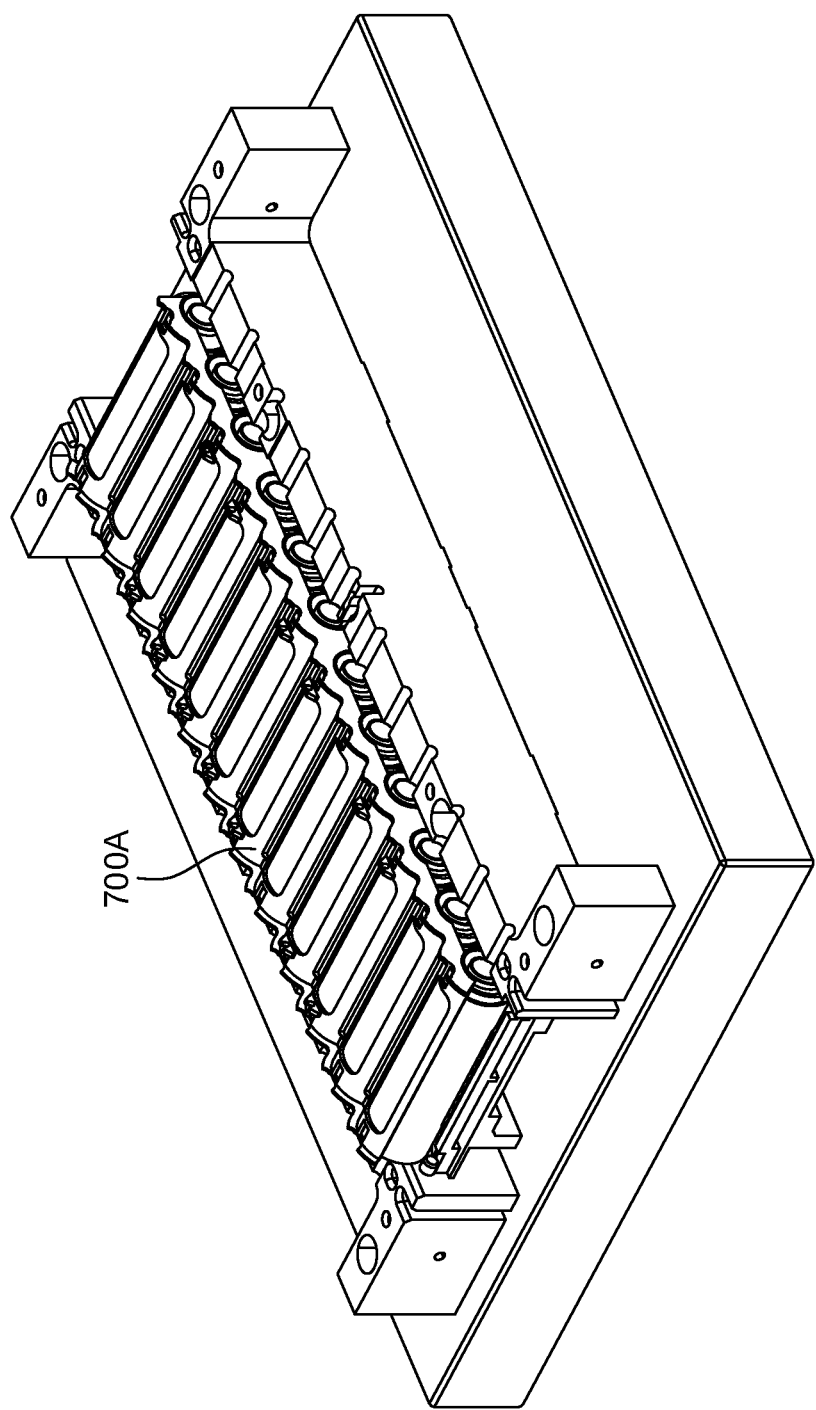
Figure 7B:
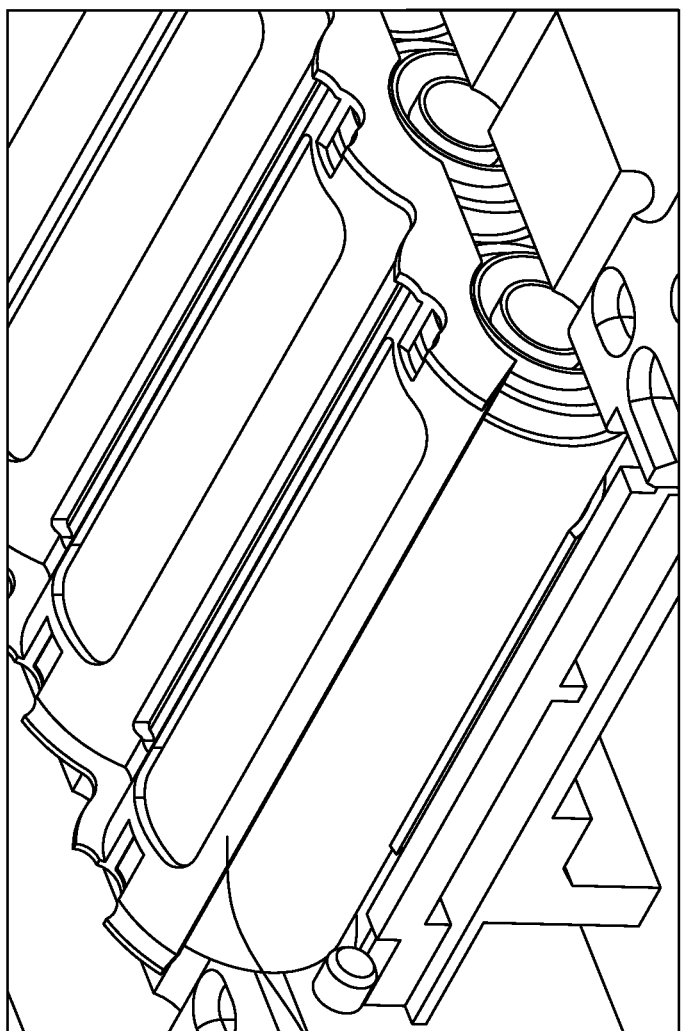

Referring to FIG. 7A, a spacer 700A is added on top of the cell layer 1. The spacer is arranged to define a spacing between the cell layer 1 and a cell layer 2 (not shown in FIG. 7A). In an example, the spacer 700A may comprise a piece or several pieces (e.g., made from plastic).

Figure 8A:
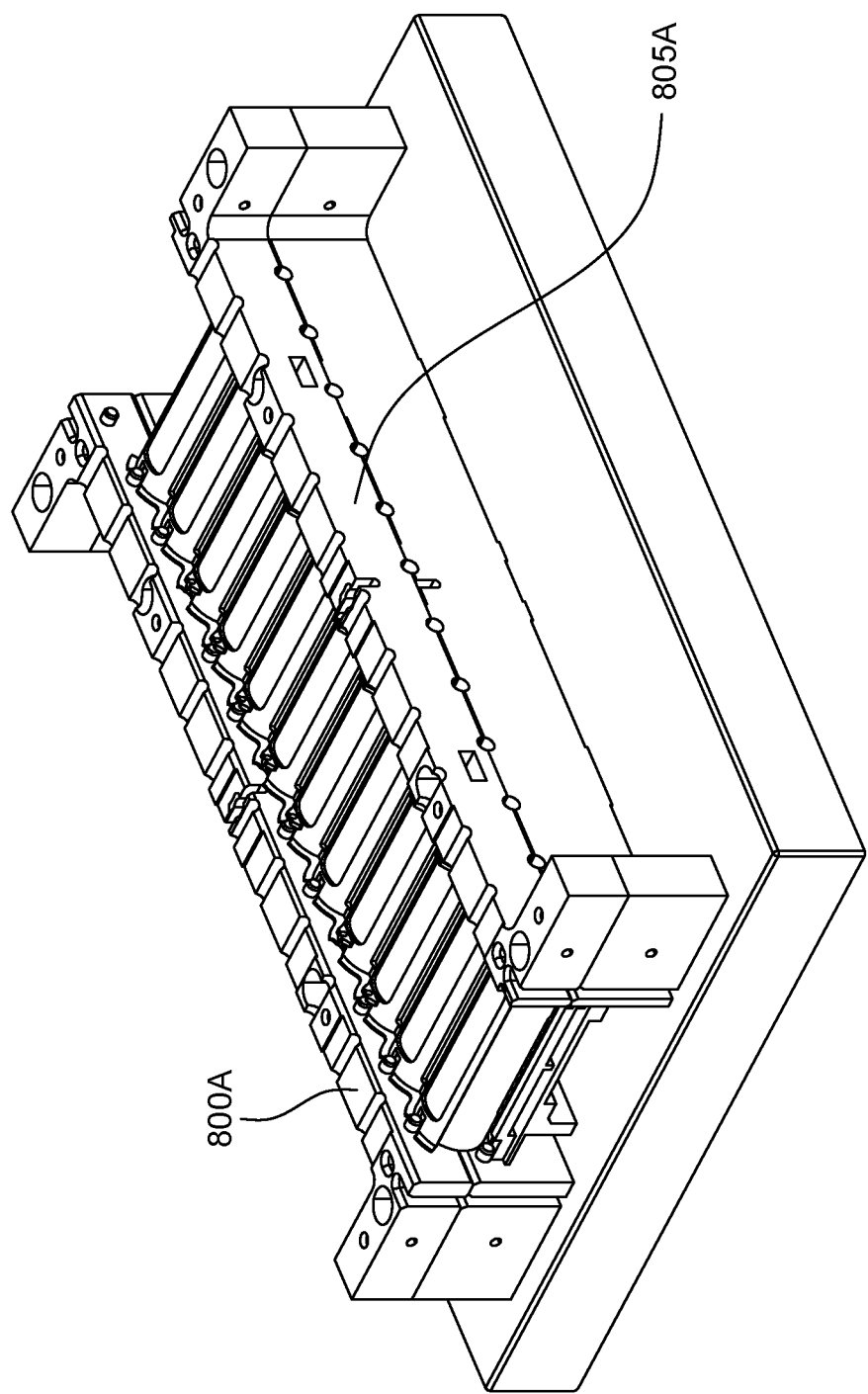

Referring to FIG. 8A, jigs 800A-805A (minus side jig 800A and plus side jig 805A) for the cell layer 2 are stacked onto the jigs 405A-410A for the cell layer 1. As shown more clearly in FIG. 8B, notches in the spacer 700A between cell layers 1 and 2 are aligned with pins 800B on the jigs for the cell layer 2.

Referring to FIG. 9A, an insulative layer 900A is placed on the spacer 700A between cell layers 1 and 2. While not shown expressly in FIG. 9A, glue may be applied to the insulative layer.

Figure 9B:
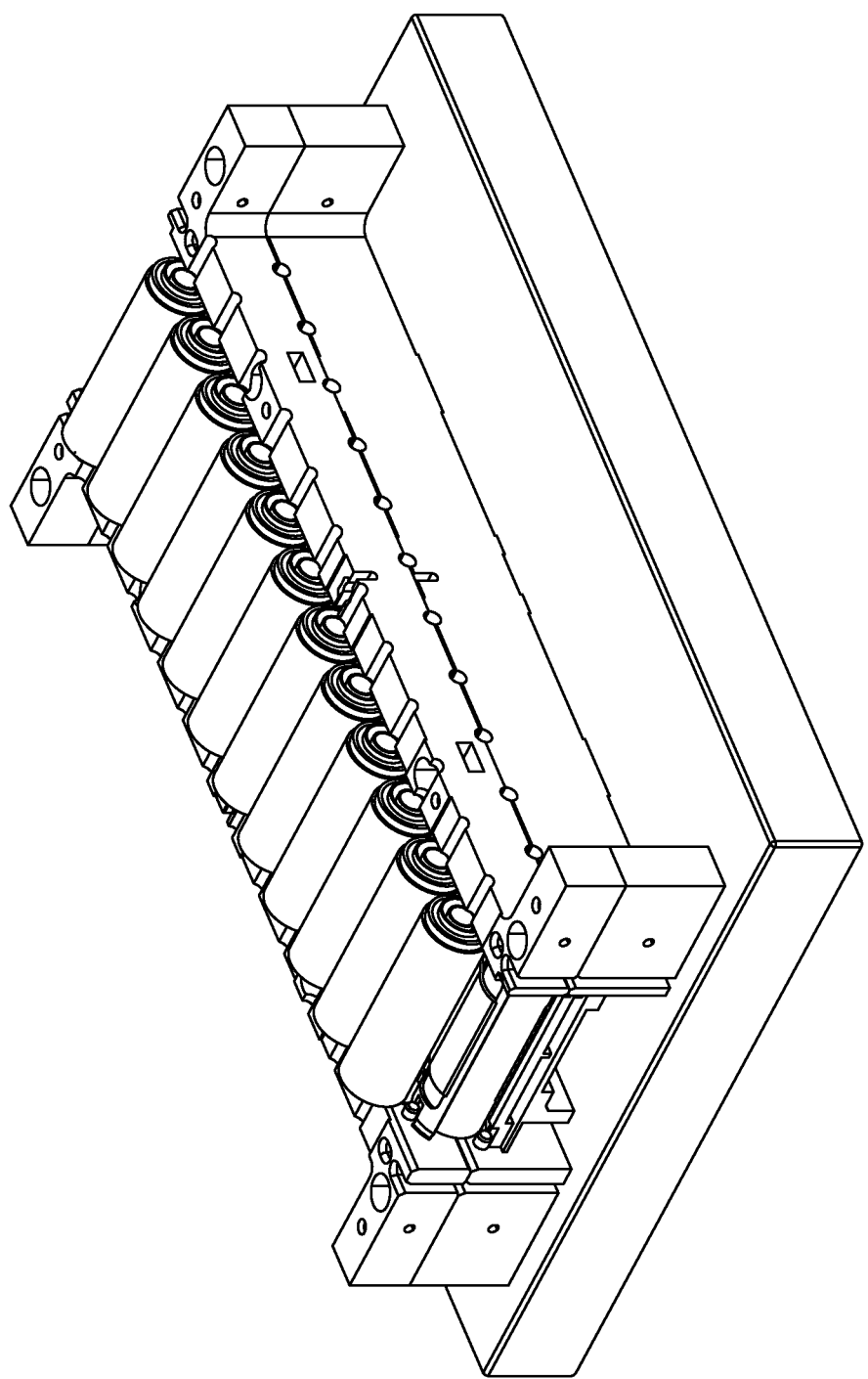

Referring to FIG. 9B, the cell layer 2 is placed onto the insulative layer and secured via the glue. In the embodiment of FIG. 9B, the cell layer 2 includes 12 cylindrical battery cells that are each part of the same P Group. The P Group of cell layer 2 may be the same or different from the P Group of cell layer 3, depending on the configuration of contact plate(s) used in the battery module (described below in more detail).

Figure 10:
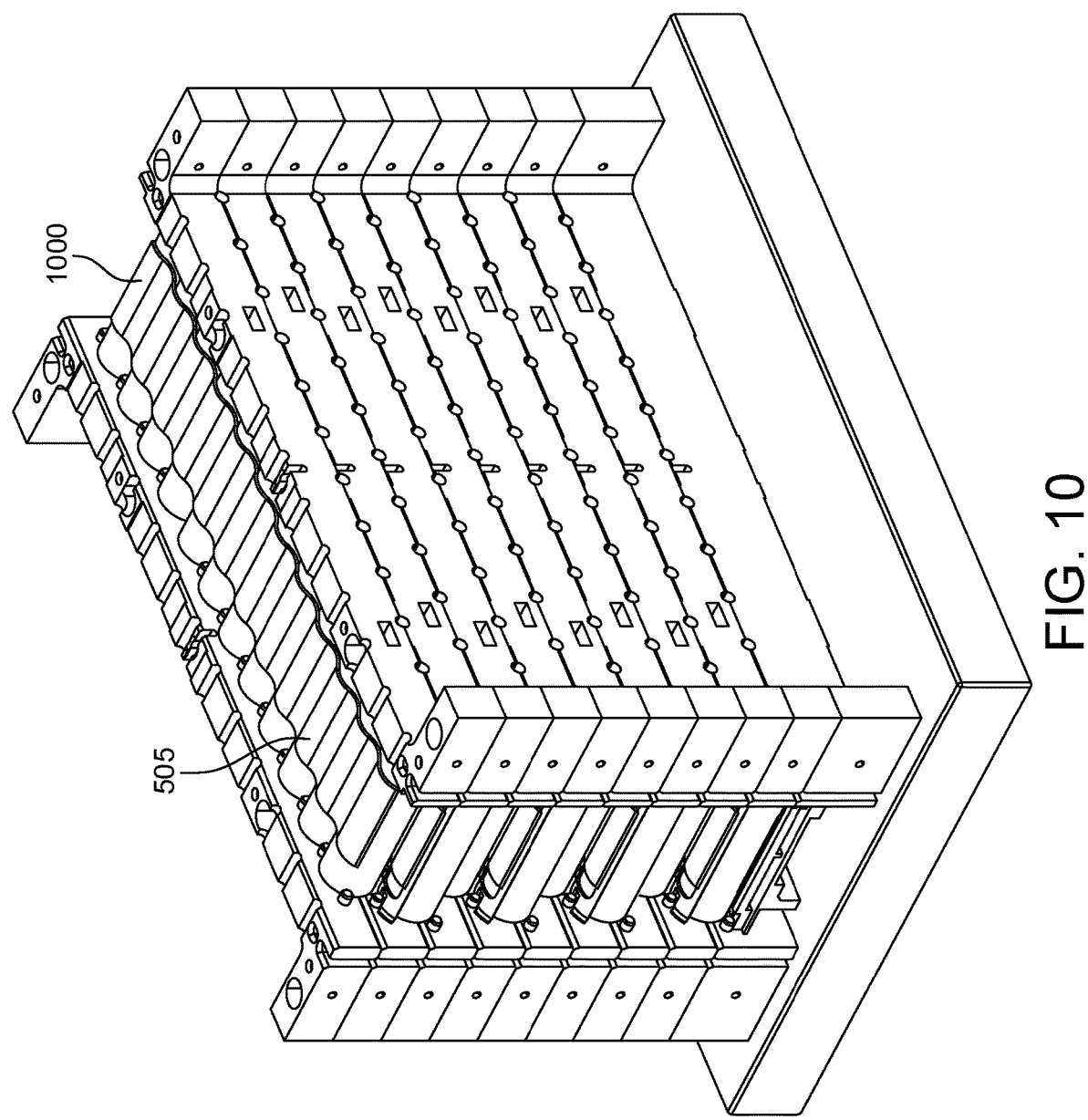
Figure 11:
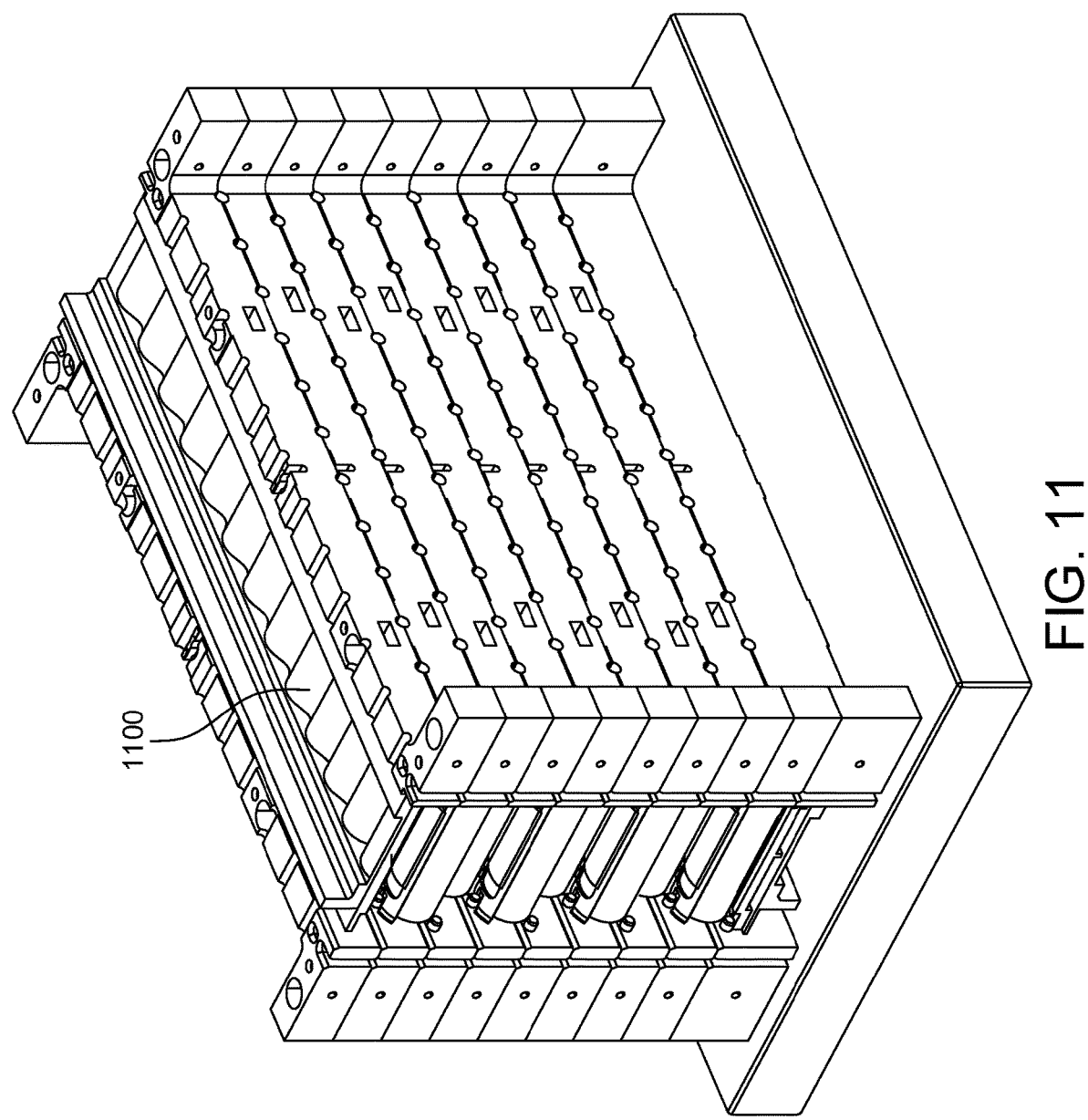
Figure 12A:
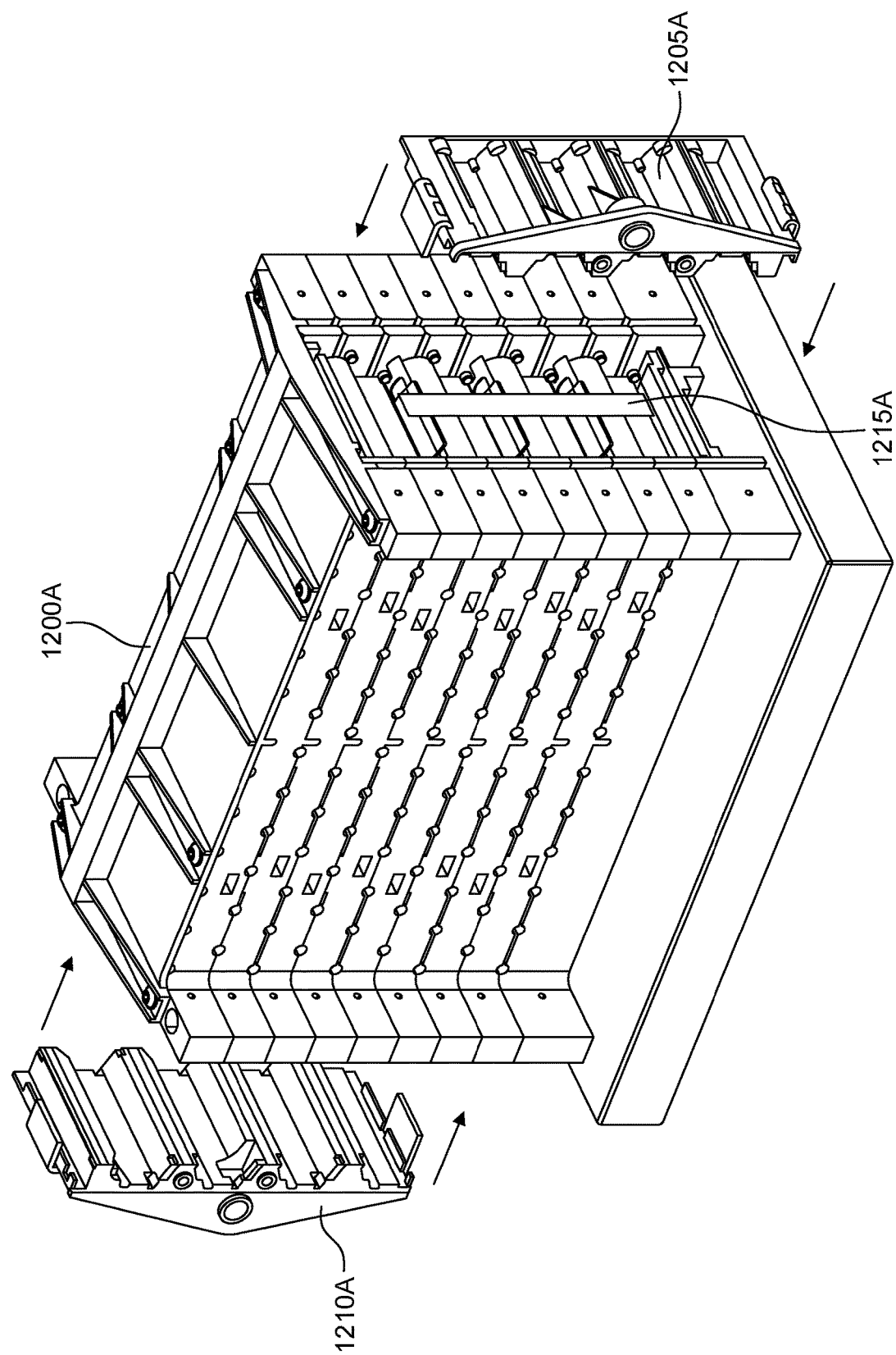
Figure 12B:
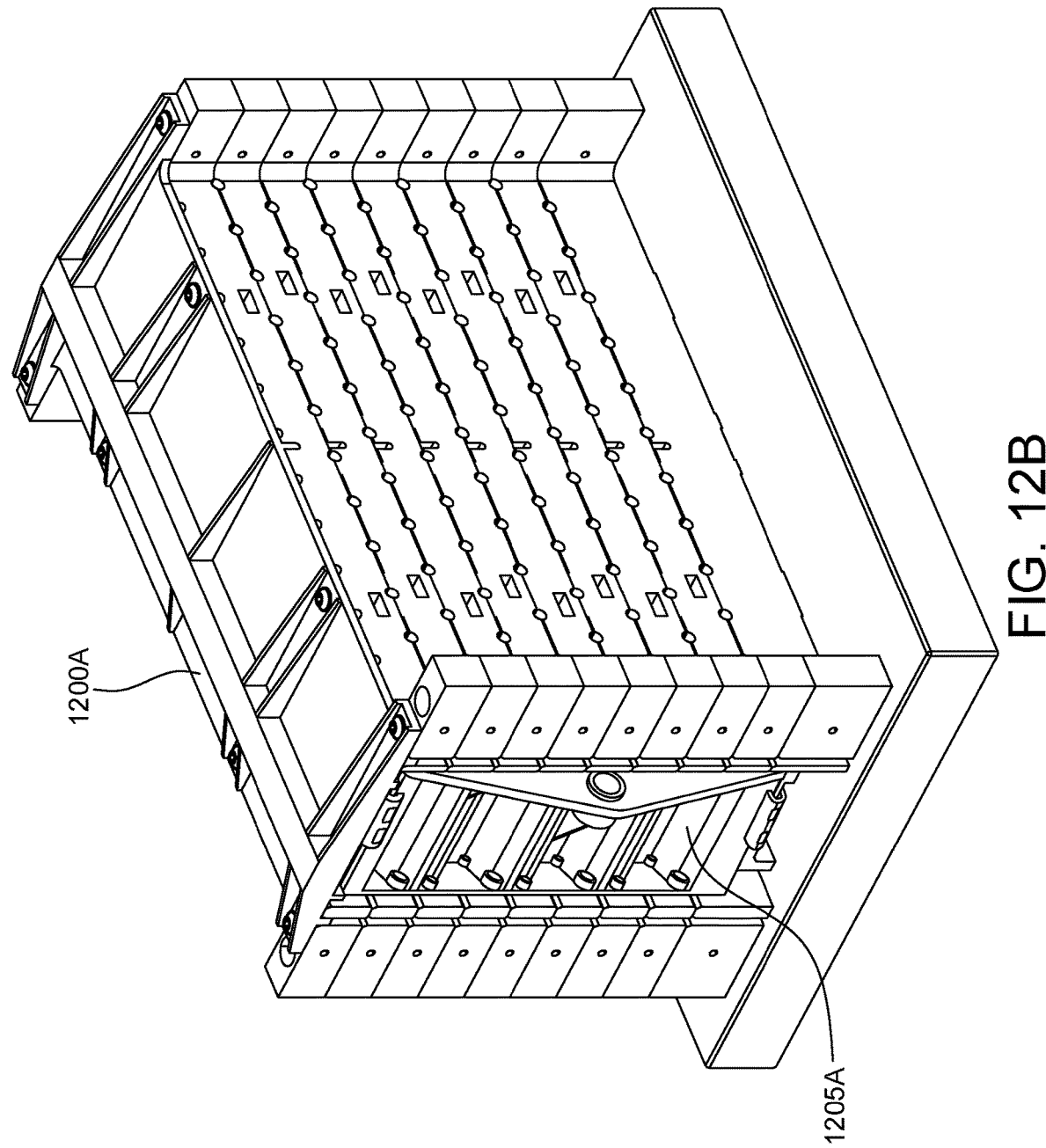
Figure 13:
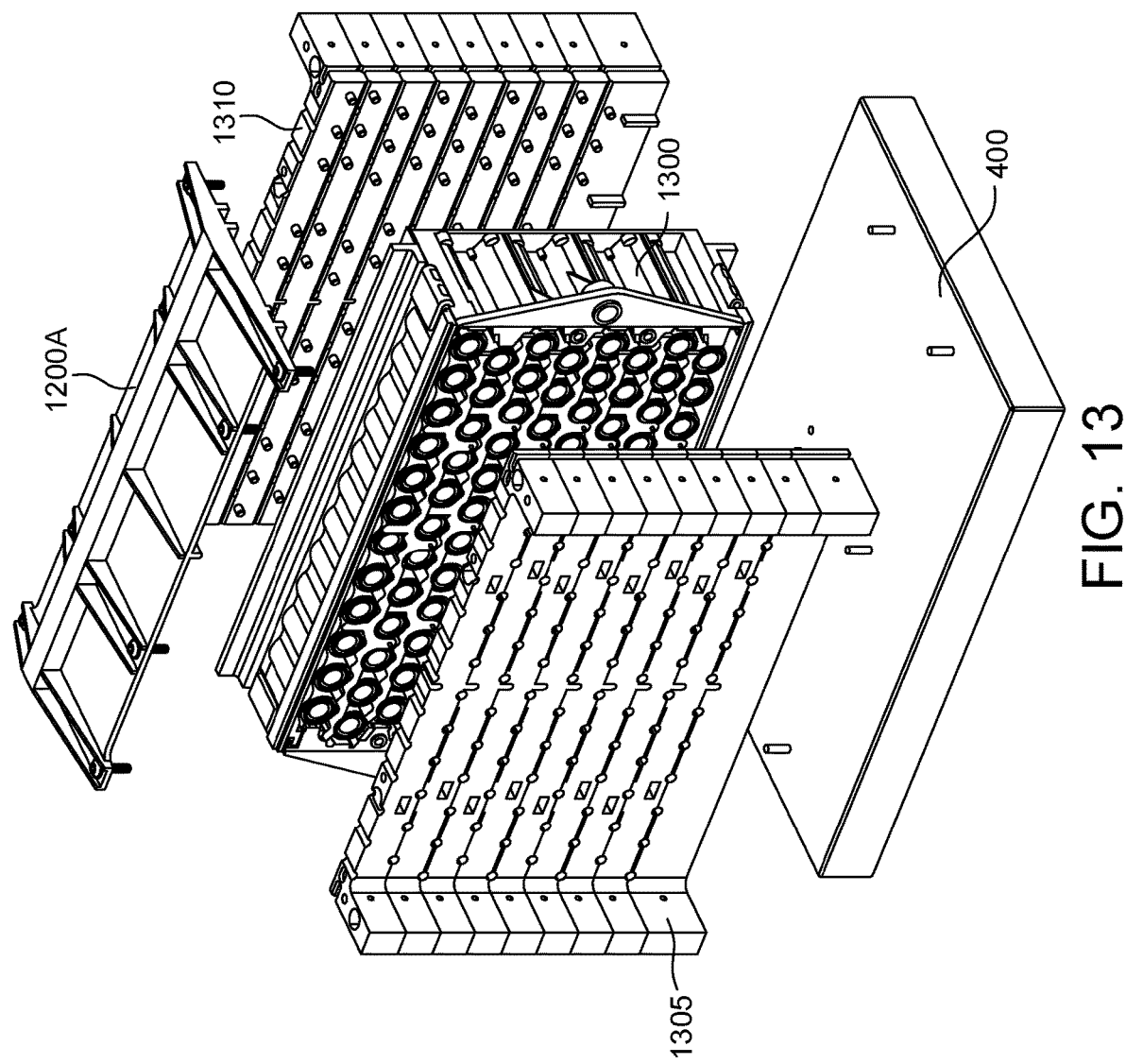

At this point, the processes depicted in FIGS. 7A-9B may repeat a given number of times until a desired number of cell layers are constructed, resulting in the arrangement depicted in FIG. 10 including cell layers 1-8. As shown in FIG. 10, glue is applied to the top-most insulative layer 1000, after which another external frame component 1100 is attached to the top-most insulative layer 1000 as shown in FIG. 11. As shown in FIGS. 12A-12B, a top jig 1200A is added, after which opposing sidewalls 1205A-1205A are attached via glue 1210A. The battery module 1300 is then separated from respective jig towers 1305-1310, top jig 1200A and the base plate 400 as shown in FIG. 13.

Figure 14A:
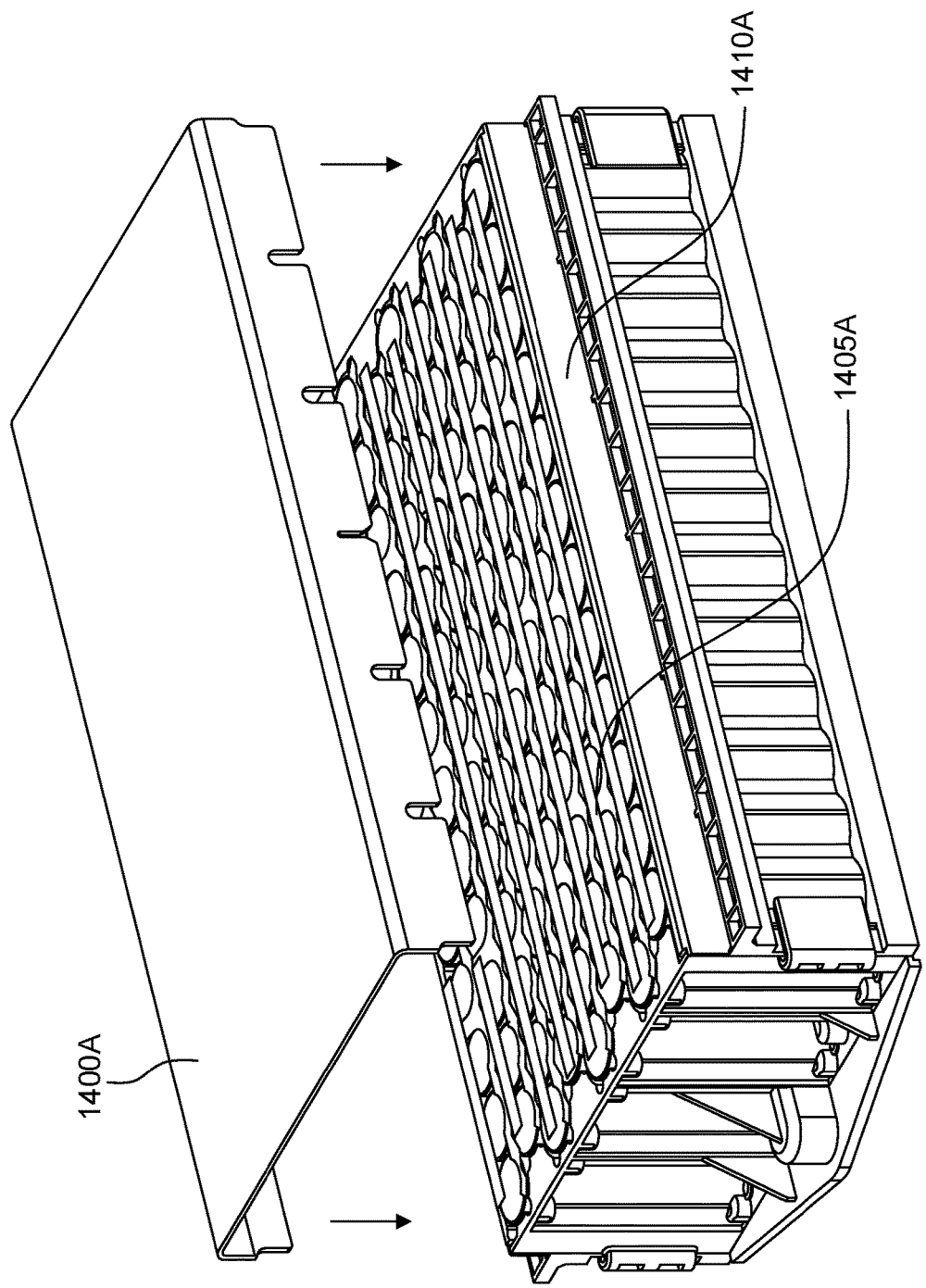
Figure 14B:
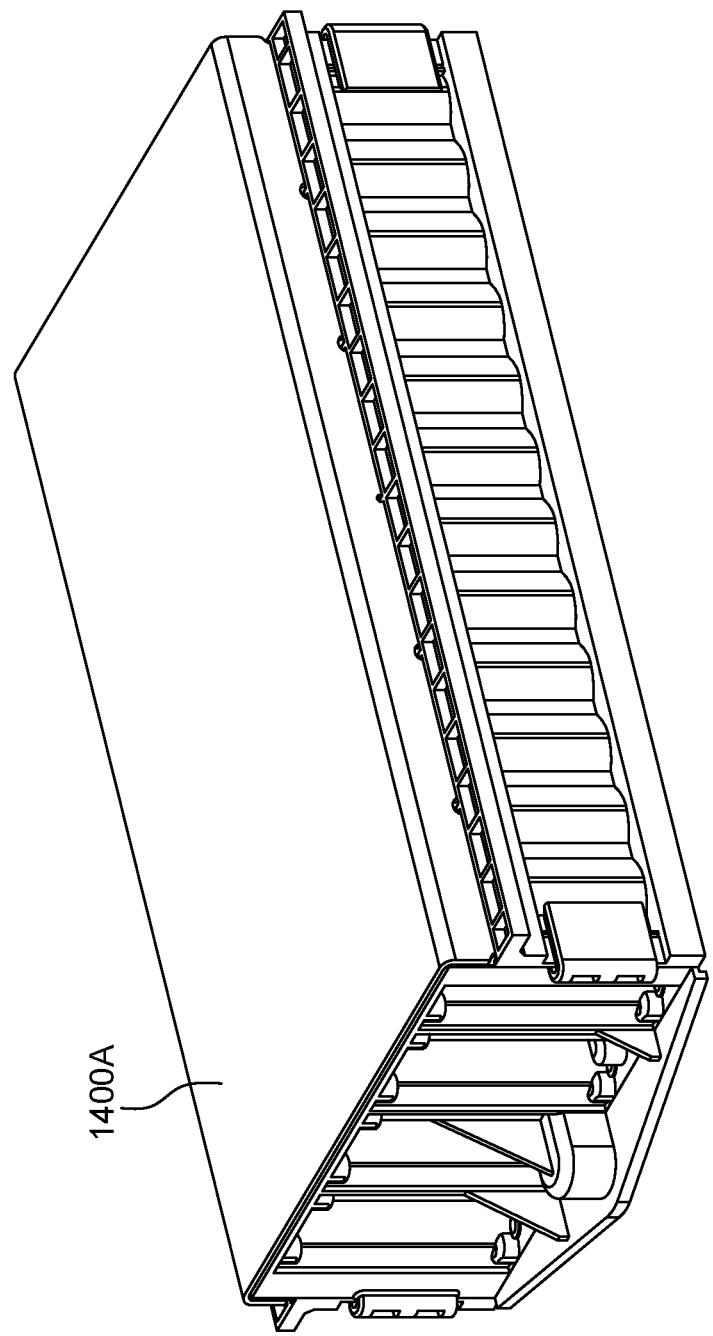

Referring to FIGS. 14A-14B, a bottom plate 1400A is secured to the battery module via glue 1405A arranged inside of respective slots 1410A.

Figure 15B:
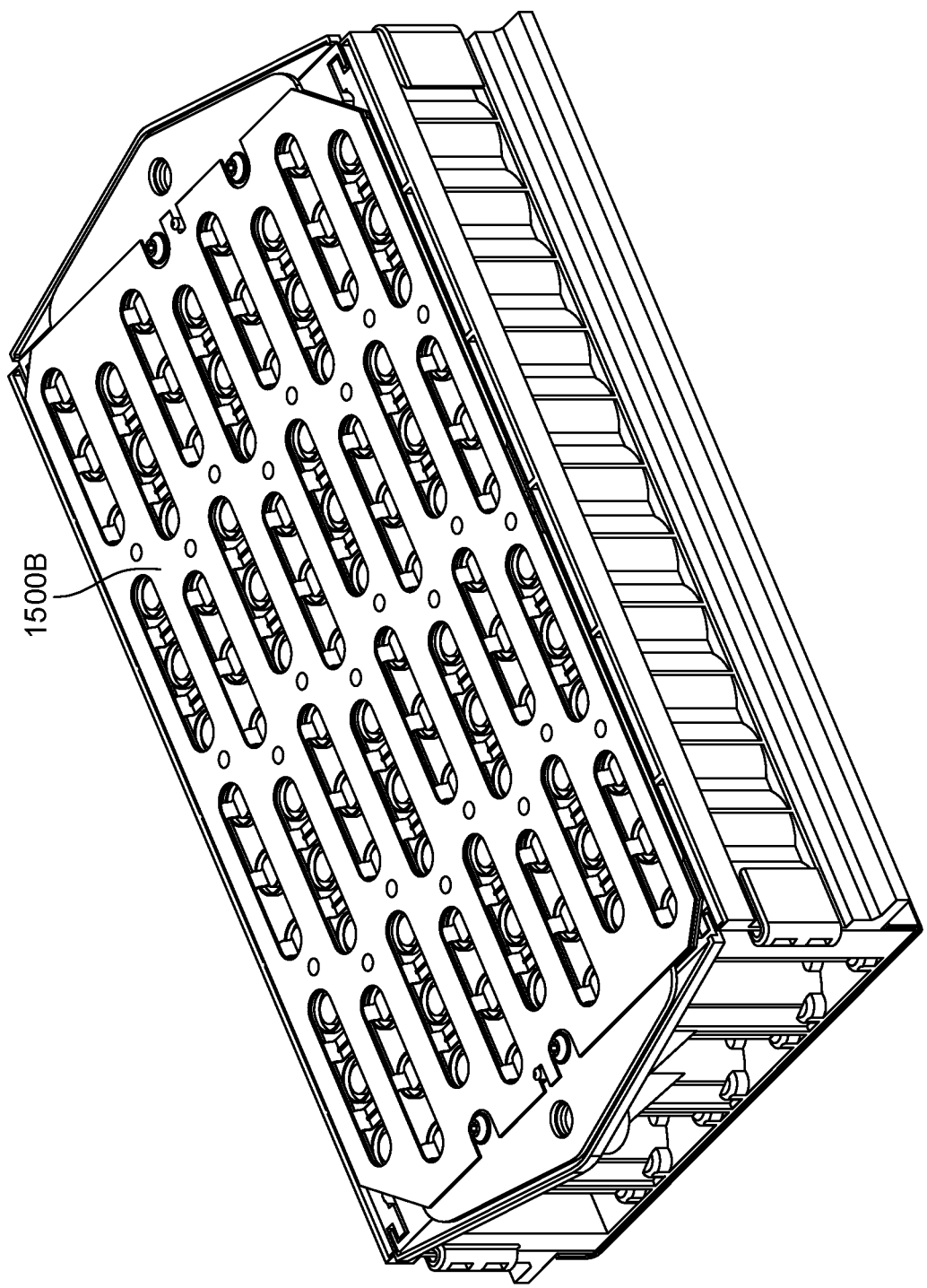
Figure 15C:
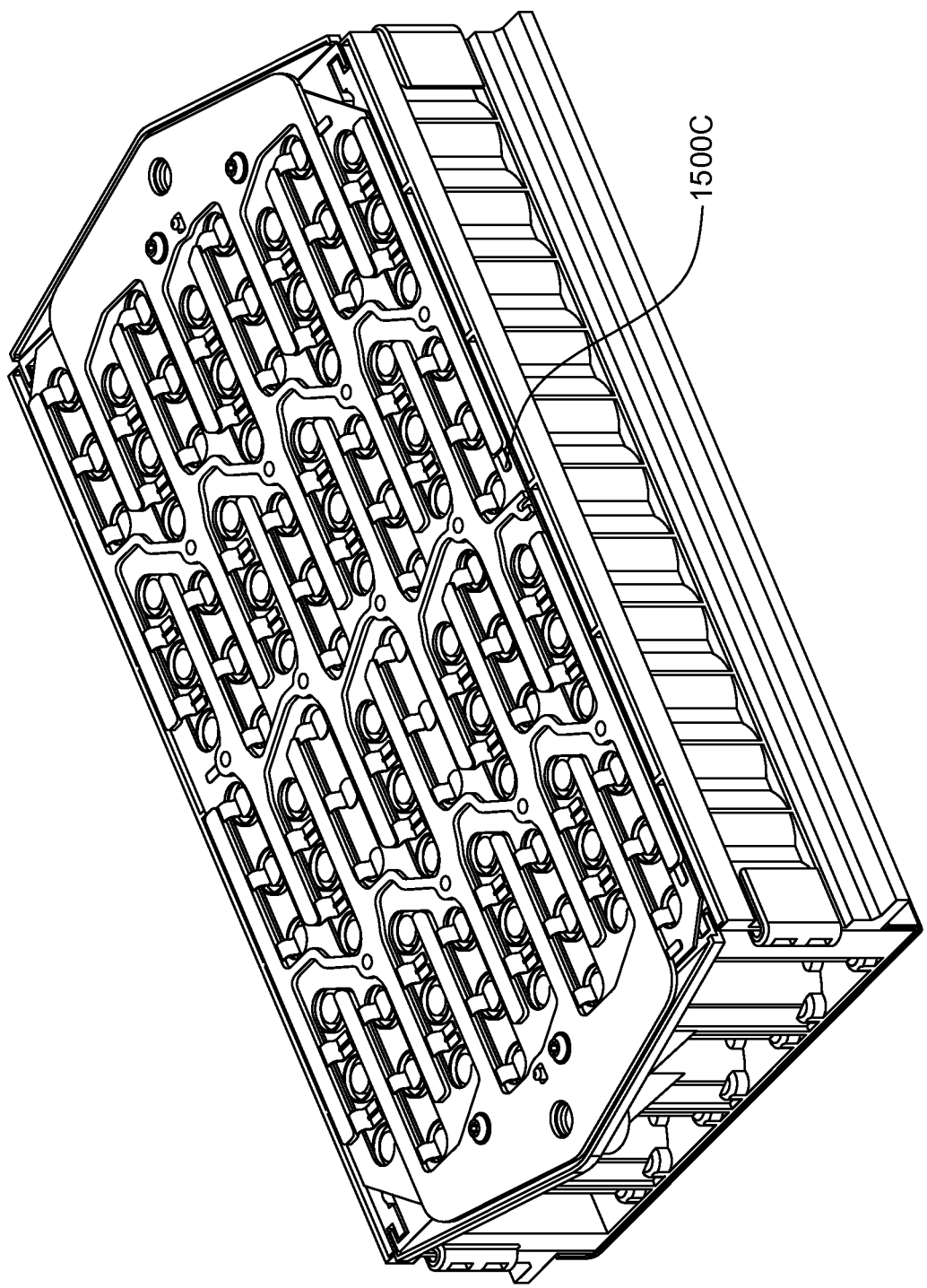

Referring to FIG. 15A, a conductive plate (or contact plate) 1500A is arranged over the battery cells (e.g., fixed with glue) of the battery module. In an example, the contact plate 1500A may be secured in place via glue 1505A. FIG. 15B depicts an alternative contact plate 1500B that comprises 2-layer foil. Examples of contact plates are described at least with respect to FIGS. 7A-8B of U.S. Patent Publication No. 2018/0108886A1, entitled "Multi-layer contact plate configured to establish electrical bonds to battery cells in a battery module", and hereby incorporated by reference in its entirety. Referring to FIG. 15C, the contact plate of FIG. 15A may further include contact tabs 1500C onto which sensor wire may be connected (e.g., thermistors).

Figure 16A:
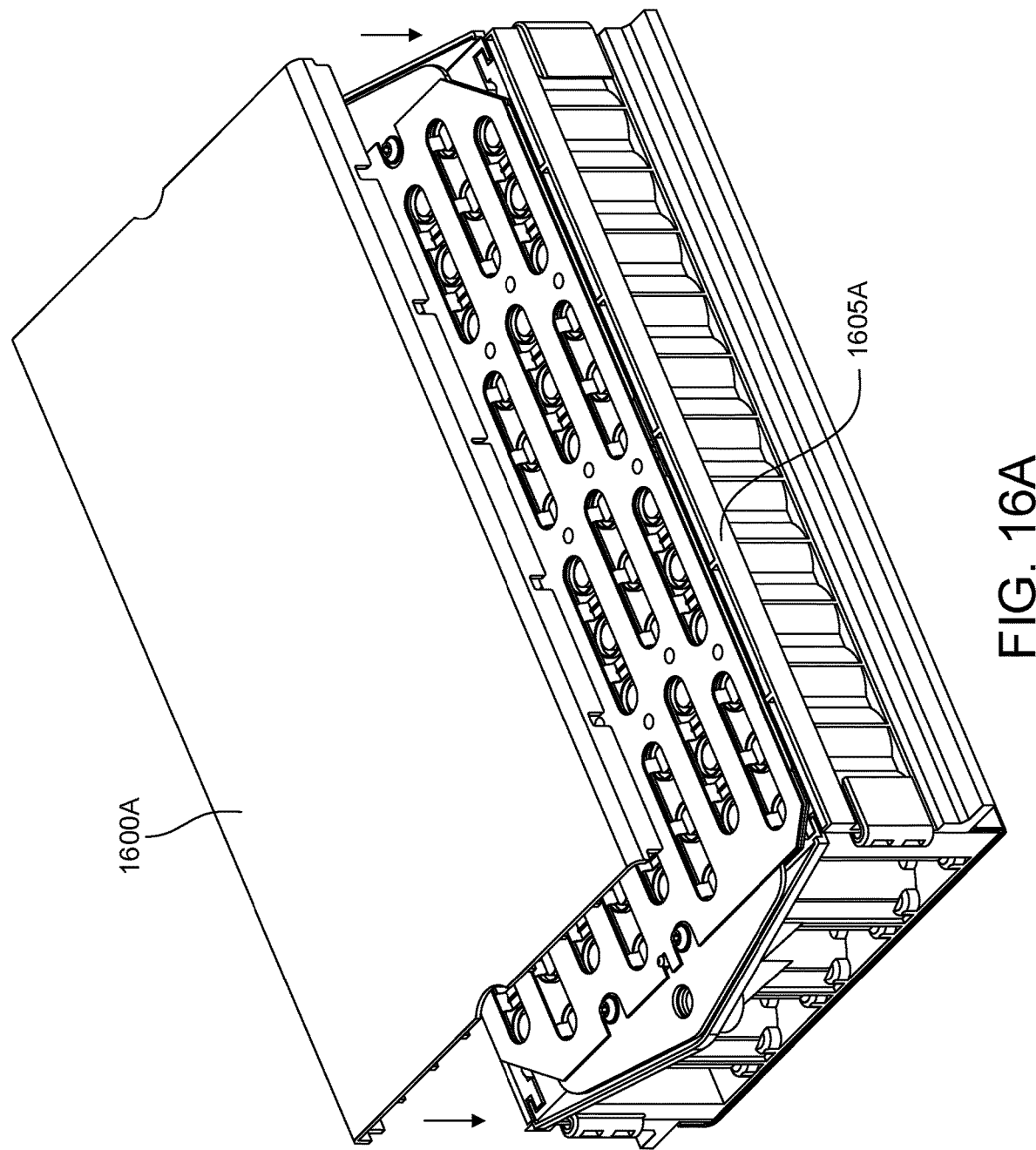
Figure 16B:
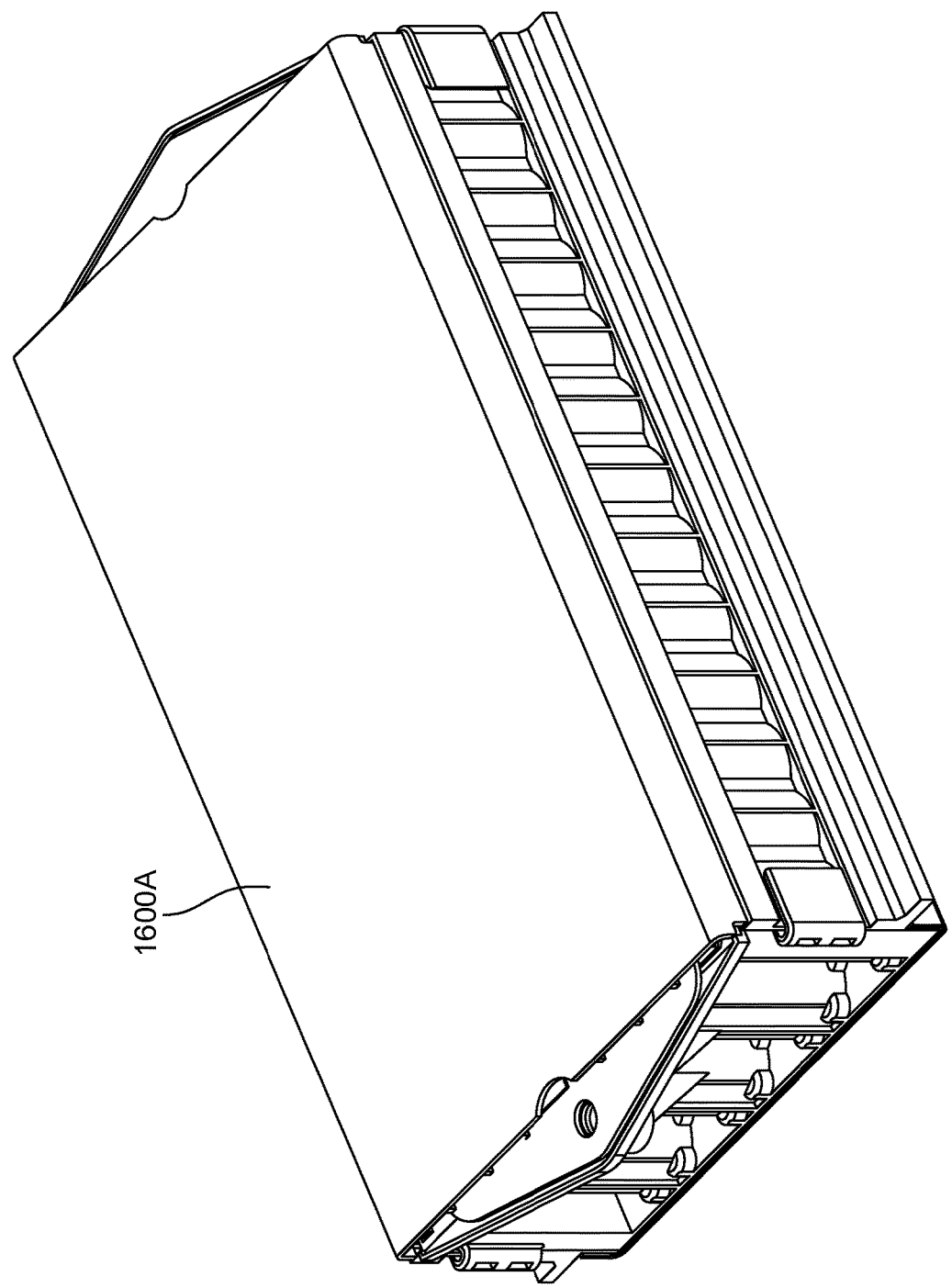

Referring to FIGS. 16A-16B, a cover (or top plate) 1600A is added to the battery module (e.g., via glue arranged within slots 1605A). At this point, the battery module is complete and may be deployed as part of an energy storage system (e.g., for an electric vehicle). The external parts of the battery module (e.g., external frame components, sidewalls, bottom plate and cover) collectively comprise a battery housing for the battery cells contained therein.

Figure 8B:
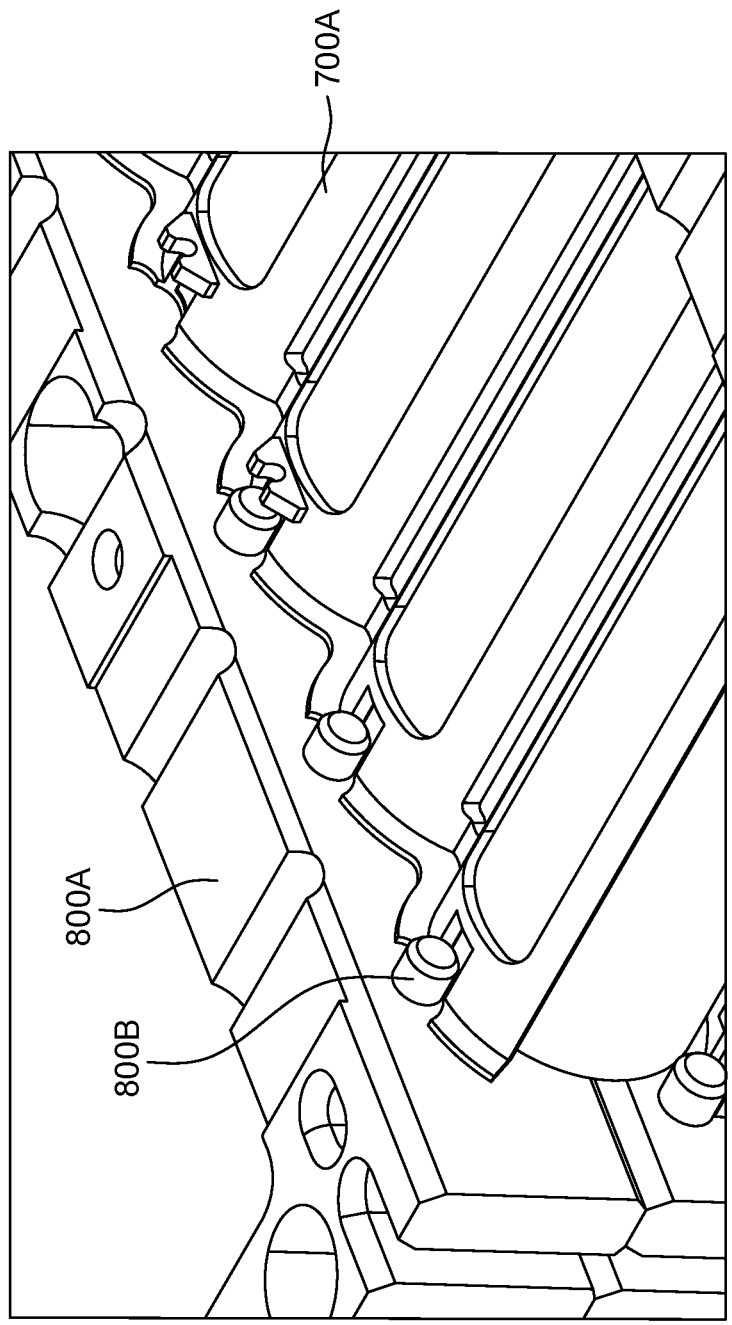
Figure 17:
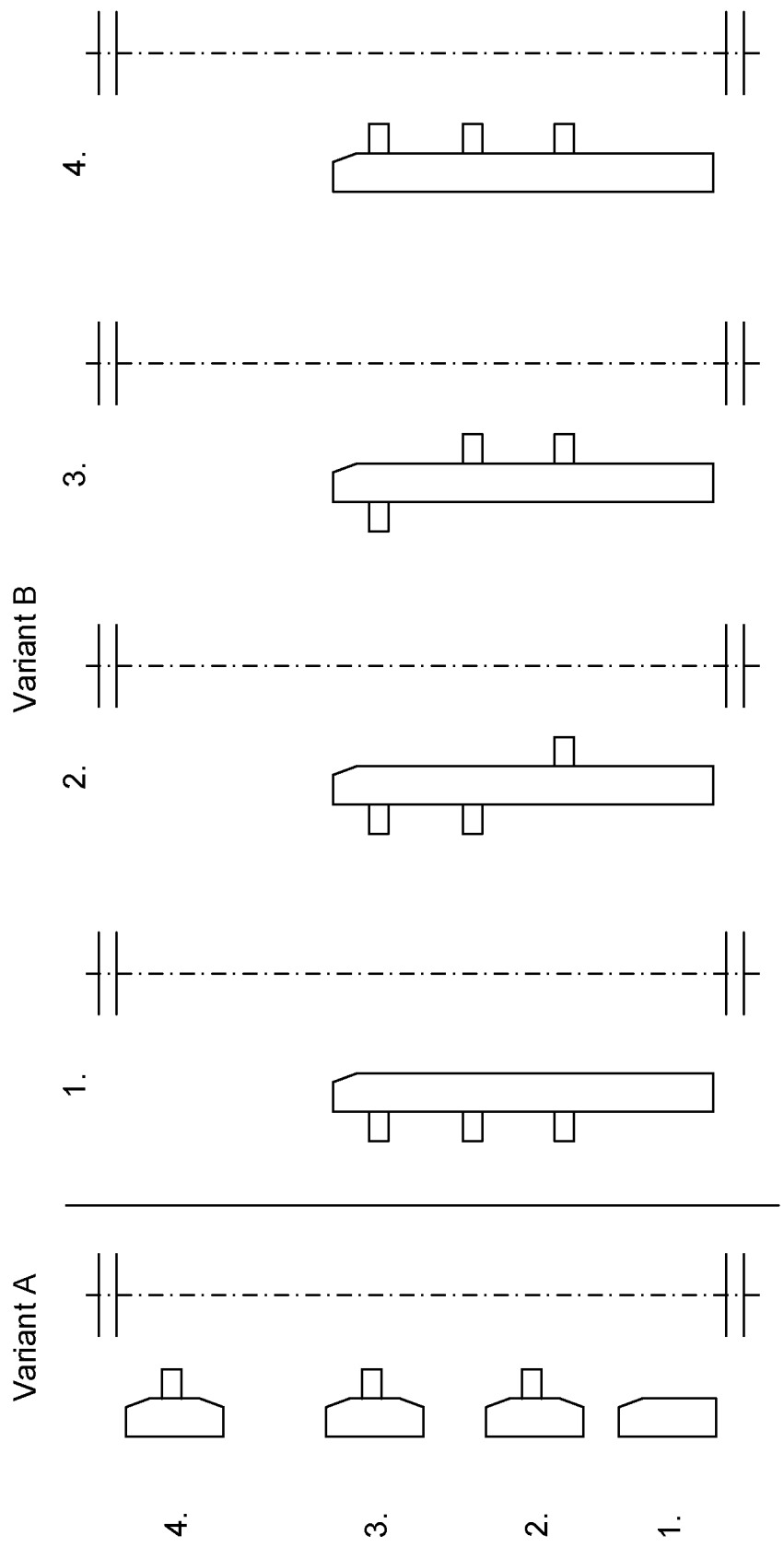
FIG. 17 illustrates two variants of pin arrangements in an assembly device.

FIG. 17 illustrates two variants of pin arrangements in the assembly device (i.e., in the minus side and plus side jigs). The pins shown in FIG. 17 map to the pins that are aligned with inter-cell layer spacers, such as pins 800B being aligned with space 700A as shown in FIGS. 8A-8B.

In variant A, the pins are fixed on different jigs and are added when each new jig is added as illustrated in FIGS. 4-16B. In this case, respective jig towers successively increase in height as each new jig level is added. In variant B, a jig tower that comprises a plurality of stacked jigs and/or a single large structure (one large jig comprising multiple cell layers) is used, whereby pins can be set to a withdrawn position (not inserted) or an inserted position. In variant B(1), each pin of the jig tower is withdrawn. In variant B(2), the pin for cell layer 1 is inserted. In variant B(3), the pin for cell layers 1 and 2 are inserted. In variant B(3), the pin for cell layers 1-3 are inserted. As will be appreciated, the jig tower can span any number of cell layers, and multiple jig towers and/or individual jigs can be stacked together as well.

Figure 18:
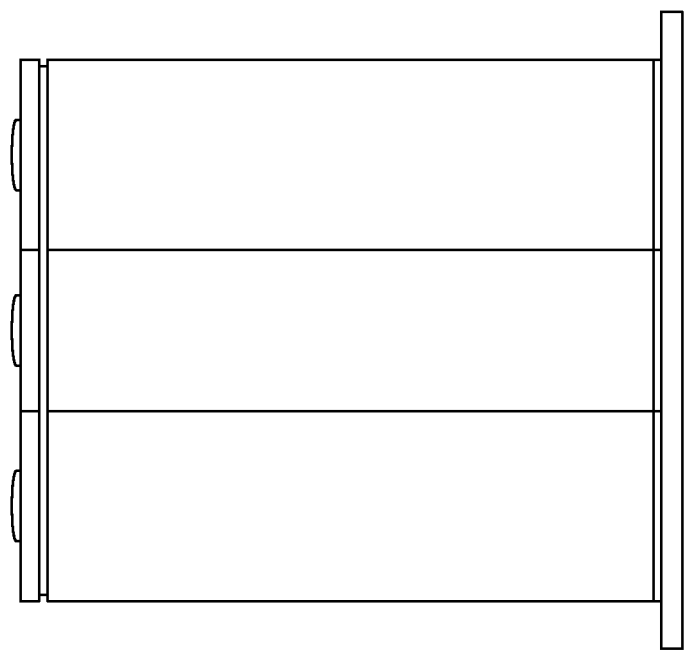
FIG. 18 illustrates a coordinate system (x, y, z) for battery cell arrangements.
Figure 18:
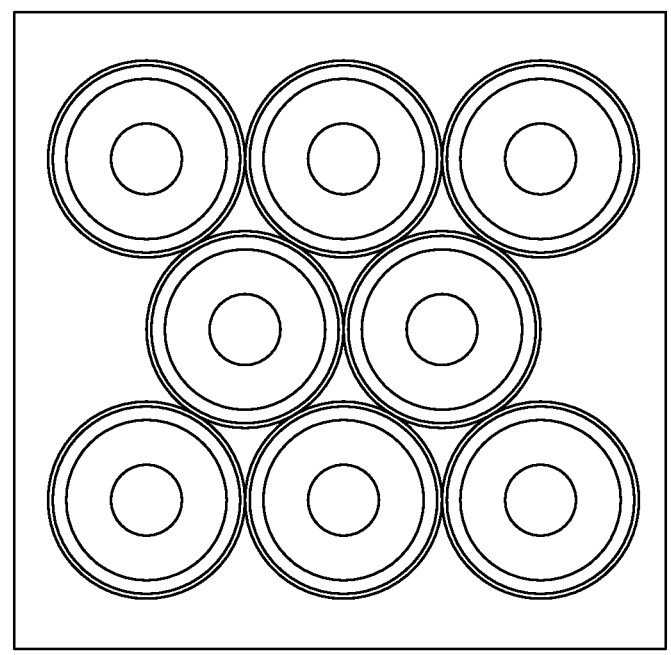

Referring to FIG. 18, a coordinate system (x, y, z) is defined for battery cell arrangements is defined. In an example, the battery cells depicted in FIG. 18 may correspond to a sampling of battery cells arranged in three adjacent cell layers during the process of FIGS. 4-17.

Embodiments of the disclosure are directed to cell brackets arranged inside a battery module (e.g., such as the battery module constructed in accordance with FIGS. 4-17) to fix battery cells so as to provide the dual function of (i) securing battery cells into proper position in the battery module during normal operation, and (ii) being arranged to break so as to reduce a likelihood of cell rupture in response to a collision.

Figure 19:
FIG. 19 illustrates different perspectives of a three-cell bracket in accordance with an embodiment of the disclosure.
Figure 19:
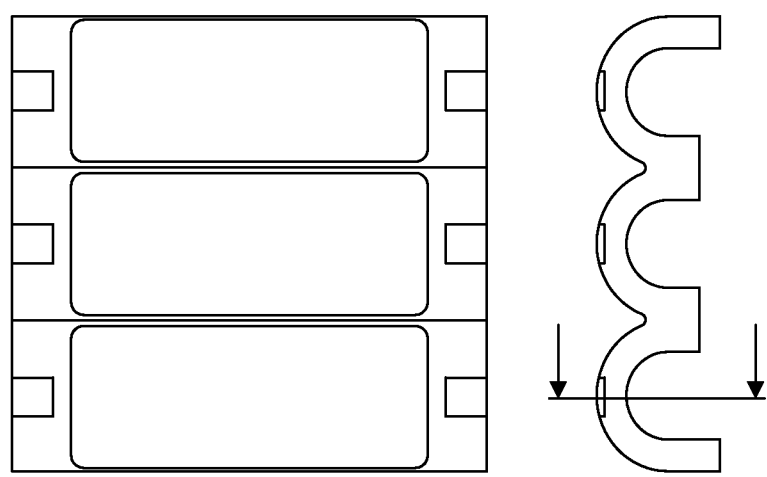
Figure 19:

Referring to FIG. 19, different perspectives of a three-cell bracket 1900 are depicted. The three-cell bracket 1900 of FIG. 19 is configured to secure three contiguous battery cells in a particular cell layer that are part of the same P Group. In an example, the spacer 700A described above with respect to FIGS. 7A-7B may be implemented as four (4) separate three-cell brackets 1900.

Figures 20A, 20B, 20C, 20D:
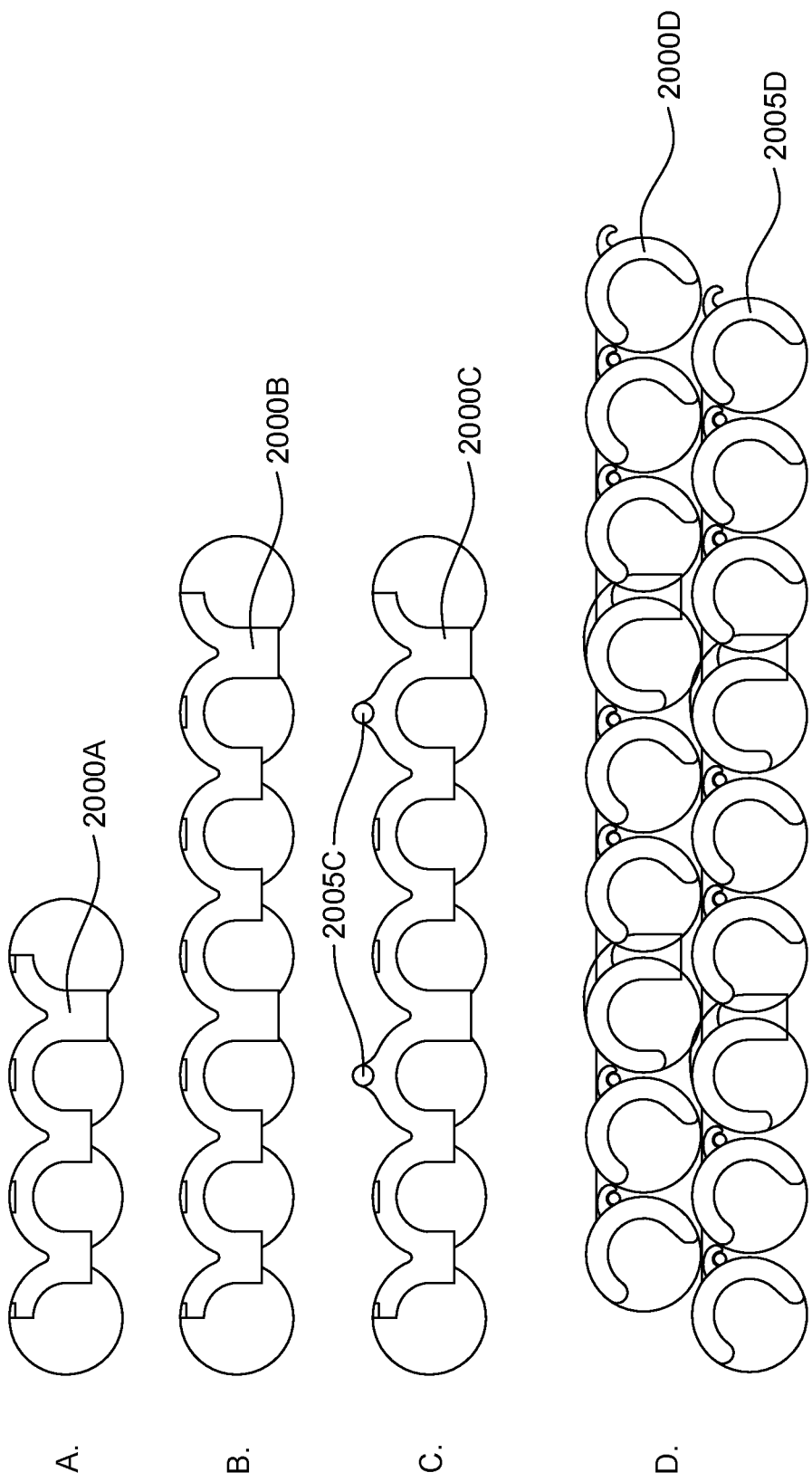
FIGS. 20A-20D illustrate alternative cell bracket configurations to the three-cell bracket depicted in FIG. 19 in accordance with embodiments of the disclosure.

FIGS. 20A-20D illustrate alternative cell bracket configurations to the three-cell bracket depicted in FIG. 19. In FIG. 20A, a cell bracket 2000A spans two whole cells plus two half-cells on each side along the y direction. In FIG. 20B, a cell bracket 2000B spans five whole cells plus two half-cells on each side along the y direction. In FIG. 20C, a cell bracket 2000C is configured similarly to FIG. 20B except that the cell bracket 2000C of FIG. 20C further includes two positioning pins 2005C (e.g., to keep the cell bracket in a defined position). In FIG. 20D, adjacent single-cell brackets on the same cell layer are clicked (or latched) together via 'click belts' 2000D-2005D of brackets for two cell layers. Accordingly, there are a variety of ways in which the cell brackets may be implemented in accordance with embodiments of the disclosure.

Figure 21:
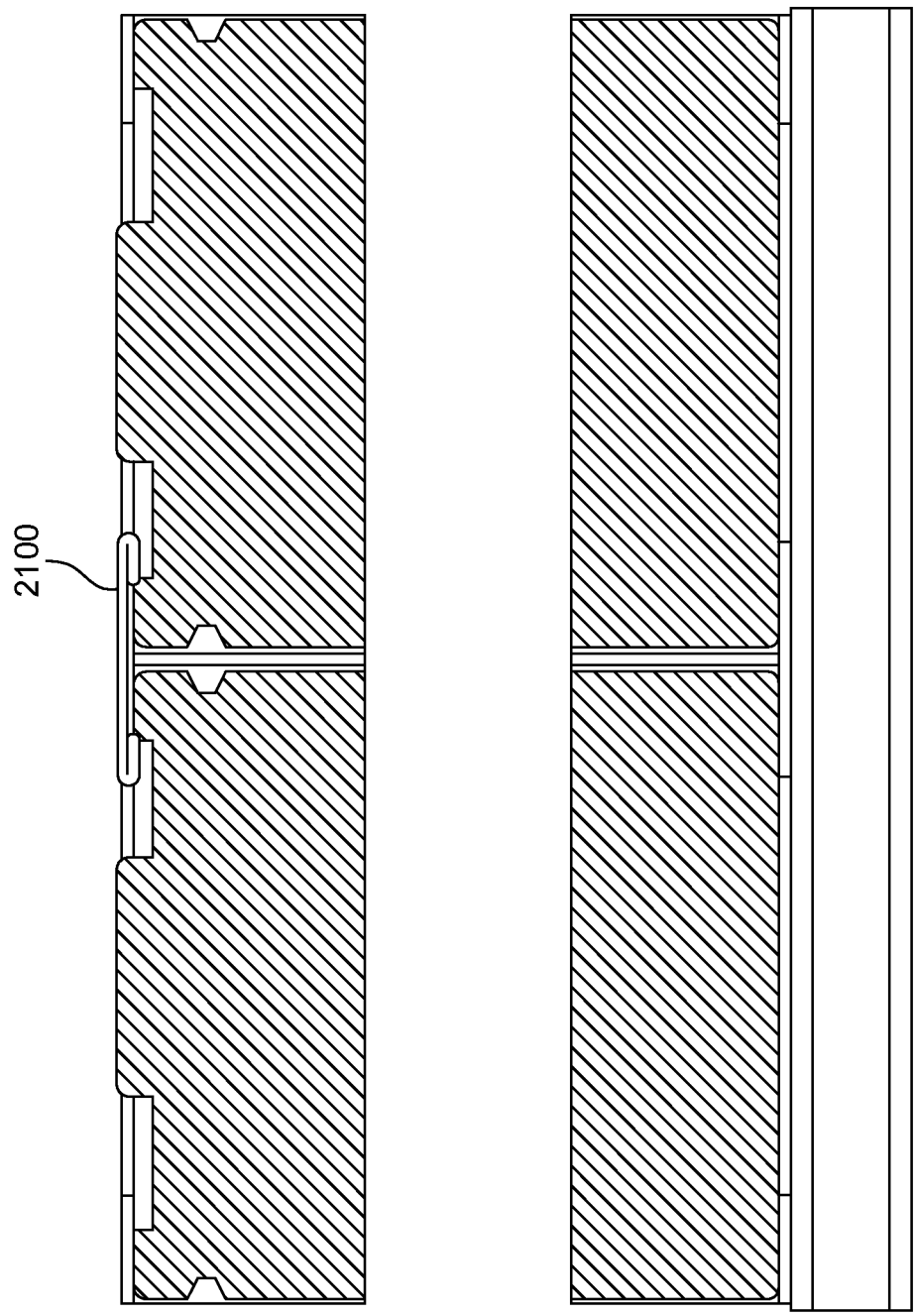
FIG. 21 illustrates an example whereby cell brackets configured in accordance with any of FIGS. 19-20D are placed over two adjacent battery cells in accordance with embodiments of the disclosure.

FIG. 21 illustrates an example whereby cell brackets configured in accordance with any of FIGS. 19-20D are placed over two adjacent battery cells. In an example, the cell brackets may be formed form an insulative material (e.g., plastic) and may function to increase a creeping path (or electrical creeping distance over which arcs may occur) between battery cells of different P Groups. For example, at 2100, a top part of two adjacent cell brackets may partially wrap the negative cell rims of adjacent battery cells so as to increase a level of electrical separation therebetween.

FIGS. 22A-22J illustrate an example battery module assembly procedure in accordance with an embodiment of the disclosure. In each of FIGS. 22A-22J, a side perspective of the battery module assembly facing the battery cell shafts is depicted on the left, and a perspective of the battery module assembly facing the positive cell terminals of the battery cells is depicted on the right.

Figures 22A, 22B, 22C, 22D, 22E, 22F, 22G, 22H, 22I, 22J:
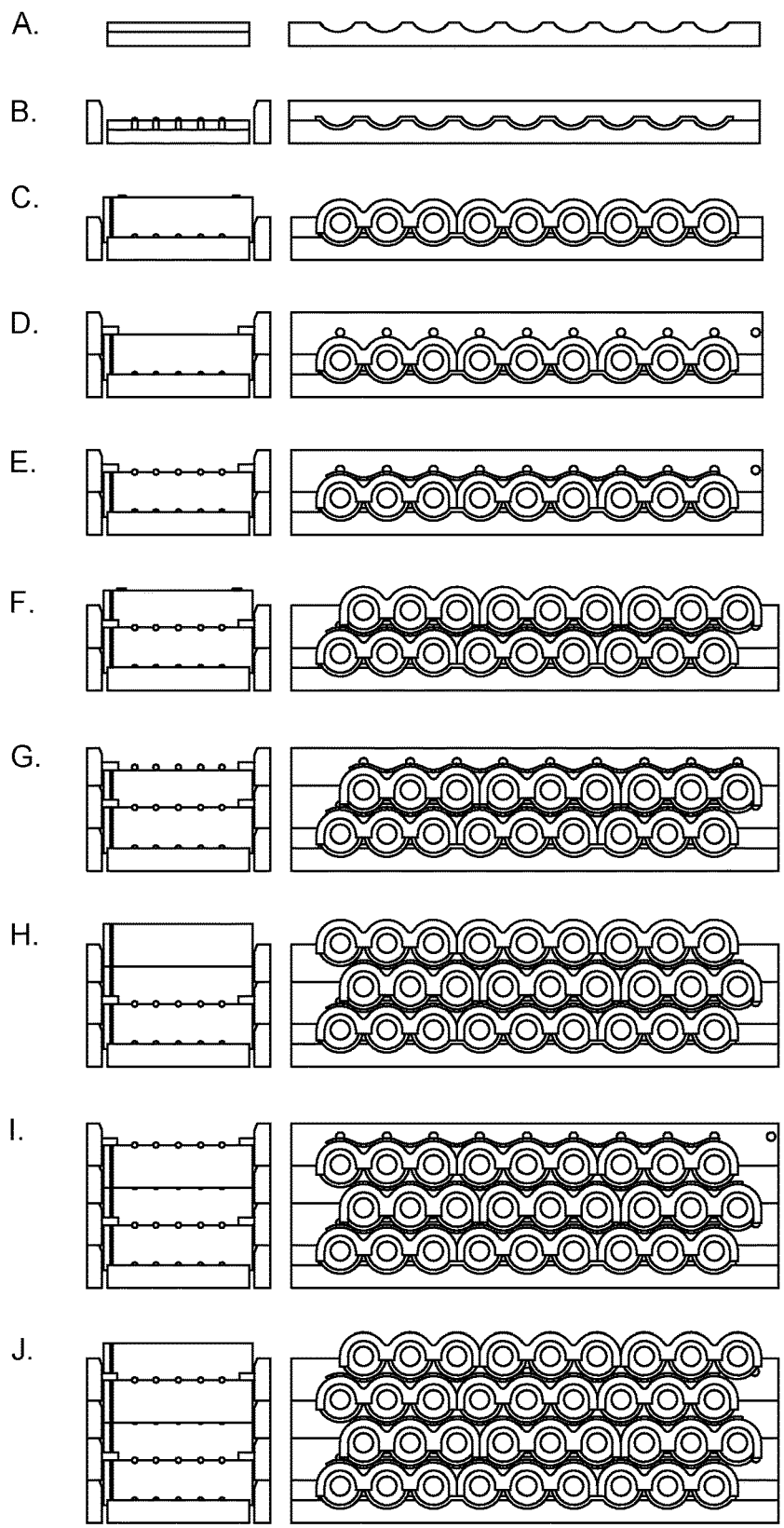
FIGS. 22A-22J illustrate an example battery module assembly procedure in accordance with an embodiment of the disclosure.

In FIGS. 22A-22J, each cell layer comprises nine total battery cells, with three (3) three-cell brackets used as spacers between adjacent cell layers. The process stages depicted in FIGS. 22A-22J generally correlate to an example implementation of the battery module assembly stages of FIGS. 4-17 as discussed above, except that the spacer is comprised of multiple three-cell brackets instead of a single end-to-end piece. In summary:

FIG. 22A: one module housing part (external frame component 420 as in FIG. 4) is positioned in line, FIG. 22B: side guiding of cells applicate and glue lines are dispensed to the module housing part (e.g., insulation layer 500 is added along with glue 505 as in FIG. 5), FIG. 22C: there are two variants, (i) preassembled cell in the bracket are positioned to the glued housing part or (ii) cells positioned into the glued housing part and after that the bracket will be mounted (e.g., as in FIGS. 6A-7B), FIG. 22D: next assembly device (e.g., jigs) to positioning cells are adapted to the assembly device (e.g., as in FIGS. 8A-8B), FIG. 22E: glue lines are dispensed to the cells and brackets (e.g., as in FIG. 9A), FIGS. 22F-21J: repetition of FIGS. 22C-22E to assemble the whole module cell stack.

Referring to FIGS. 22F-22J assembly device positioning pins ensure while glue is hardening or components are mounted in line that the cells are each fixed in a defined position.

Referring to FIGS. 19-22J, in at least one embodiment, the use of multiple brackets per battery cell layer may permit the respective brackets to 'break' in the event of a collision affecting the battery module (e.g., a vehicle crash). The breaking of the bracket(s) will permit some amount of movement (or tolerance) to the battery cells secured by those broken brackets, which may reduce a likelihood that those battery cells will rupture. By contrast, securing all battery cells into a single solid component (e.g., as in FIGS. 2-3) may not permit cell-specific breaking such that the stresses upon the battery cells will not be alleviated, leading to cell rupture. Hence, cell brackets as described with respect to FIGS. 19-22 may provide the dual function of (i) securing battery cells into proper position in the battery module during normal operation, and (ii) being arranged to break so as to reduce a likelihood of cell rupture in response to a collision.

In some designs, the cell brackets may comprise an unfilled plastic such as polybutylene terephthalate (PBT). In an example, the cell brackets may be manufactured via an injection molding process performed at a particular injection temperature that is based upon the material type (e.g., PBT, etc.). In some designs, the injection temperature may be increased from a 'normal' or recommended injection temperature specifically to weaken the cell brackets to a desired degree. In one specific example, the recommended injection temperature for PBT may be defined as a range between about 250°-280° C., and increased injection temperature for PBT may be between about 0° C.-50° C. above the upper bound (i.e., 280° C.), e.g., between about 280° C. and 330°

C. For example, the mechanical strength (or break-point) of the cell brackets can be configured with a crystalline-like structure so as to break in response to crash forces while maintaining intact during normal operating turbulence, which may vary depending on the application. When mechanical stress of such a structure exceeds some threshold (which may be regulated in part by the injection temperature) due to crash forces, the structure not only cracks but crumbles into small particles, thereby freeing the battery cells (which were previously held in place by the cell brackets).

While the embodiments described above relate primarily to land-based electric vehicles (e.g., cars, trucks, etc.), it will be appreciated that other embodiments can deploy the various battery-related embodiments with respect to any type of electric vehicle (e.g., boats, submarines, airplanes, helicopters, drones, spaceships, space shuttles, rockets, etc.).

While the embodiments described above relate primarily to battery module compartments and associated battery modules and insertion-side covers for deployment as part of an energy storage system for an electric vehicle, it will be appreciated that other embodiments can deploy the various battery-related embodiments with respect to any type of energy storage system. For example, besides electric vehicles, the above-noted embodiments can be applied to energy storage systems such as home energy storage systems (e.g., providing power storage for a home power system), industrial or commercial energy storage systems (e.g., providing power storage for a commercial or industrial power system), a grid energy storage system (e.g., providing power storage for a public power system, or power grid) and so on.

As will be appreciated, the placement of the various battery module compartments in the above-noted embodiments is described as being integrated into a vehicle floor of an electric vehicle. However, it will be appreciated that the general closed compartment profile design may be extended to battery module mounting areas that can be installed in other locations within the electric vehicle (e.g., in a trunk of the electric vehicle, behind one or more car seats, under a front-hood of the electric vehicle, etc.).

The forgoing description is provided to enable any person skilled in the art to make or use embodiments of the invention. It will be appreciated, however, that the invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the embodiments of the invention.

What is claimed is:

1. A battery module, comprising:
   a first layer of cylindrical battery cells; and
   a first set of brackets that are each configured to fix at least one cylindrical battery cell of the first layer of cylindrical battery cells into a defined position,
   wherein the first set of brackets includes a plurality of brackets, and
   wherein each bracket among the first set of brackets is configured to break independently from each other bracket among the first set of brackets in response to mechanical stress that exceeds a threshold so as to unfix one or more cylindrical battery cells from respective defined positions.

2. The battery module of claim 1, wherein each cylindrical battery cell in the first layer of cylindrical battery cells is configured to be connected in parallel with each other.

3. The battery module of claim 1, wherein each of the plurality of brackets is latched onto at least one other of the plurality of brackets.

4. The battery module of claim 1,
   wherein the battery module is configured for deployment in an electric vehicle, and
   wherein the threshold is based on a mechanical stress level that is associated with a crash of the electric vehicle.

5. The battery module of claim 1, wherein at least one of the plurality of brackets comprises polybutylene terephthalate (PBT).

6. The battery module of claim 5, wherein the at least one bracket is configured to break in response to the mechanical stress that exceeds the threshold based in part upon an injection temperature of the PBT during an injection molding process.

7. The battery module of claim 6, wherein the injection temperature is established so as to integrate a desired amount of weakness into the at least one bracket via a crystallized structure that crumbles in response to the mechanical stress that exceeds the threshold.

8. The battery module of claim 1, wherein the first set of brackets comprise one or more positioning pins to fix the first set of brackets in a defined position.

9. The battery module of claim 1, wherein at least one bracket among the first set of brackets is configured to increase an electrical creeping distance between two adjacent cylindrical battery cells.

10. The battery module of claim 9, wherein at least one bracket among the first set of brackets is configured to increase the electrical creeping distance between two negative cell rims of the two adjacent cylindrical battery cells.

11. The battery module of claim 1, further comprising:
    a second layer of cylindrical battery cells that are each configured to be connected in parallel with each other, the first and second layers being adjacent to each other; and
    a second set of brackets that are each configured to fix at least one cylindrical battery cell of the second layer of cylindrical battery cells into a defined position.

12. The battery module of claim 11, wherein each cylindrical battery cell in the second layer of cylindrical battery cells is configured to be connected in parallel with each other.

13. The battery module of claim 1, wherein at least one of the first set of brackets is pre-assembled with an associated set of fixed cylindrical battery cells.

14. The battery module of claim 1, wherein at least one of the first set of brackets is connected to an associated set of fixed cylindrical battery cells during assembly of the battery module.

* * * * *